(12) United States Patent
Fujiwara et al.

(10) Patent No.: US 11,467,118 B2
(45) Date of Patent: Oct. 11, 2022

(54) METHOD FOR MEASURING AMOUNT OF BLOOD COMPONENT IN BLOOD

(71) Applicant: PHC Holdings Corporation, Tokyo (JP)

(72) Inventors: Masaki Fujiwara, Ehime (JP); Yoshifumi Takahara, Ehime (JP); Takaaki Fujii, Ehime (JP); Junko Nakayama, Ehime (JP); Setsuko Yano, Ehime (JP); Fuminori Kutsuna, Ehime (JP)

(73) Assignee: PHC Holdings Corporation, Tokyo (JP)

( * ) Notice: Subject to any disclaimer, the term of this patent is extended or adjusted under 35 U.S.C. 154(b) by 339 days.

(21) Appl. No.: 16/636,857

(22) PCT Filed: Aug. 3, 2018

(86) PCT No.: PCT/JP2018/029303
§ 371 (c)(1),
(2) Date: Feb. 5, 2020

(87) PCT Pub. No.: WO2019/031421
PCT Pub. Date: Feb. 14, 2019

(65) Prior Publication Data
US 2020/0371060 A1 Nov. 26, 2020

(30) Foreign Application Priority Data
Aug. 10, 2017 (JP) .............................. JP2017-155815

(51) Int. Cl.
*G01N 27/327* (2006.01)
(52) U.S. Cl.
CPC ..... *G01N 27/3272* (2013.01); *G01N 27/3274* (2013.01); *G01N 27/3277* (2013.01)

(58) Field of Classification Search
None
See application file for complete search history.

(56) References Cited

U.S. PATENT DOCUMENTS

| 6,287,451 B1 | 9/2001 | Winarta et al. |
| 2007/0138026 A1 | 6/2007 | Fujiwara et al. |

(Continued)

FOREIGN PATENT DOCUMENTS

| EP | 1 152 239 | 11/2001 |
| JP | 4060078 B | 3/2008 |

(Continued)

OTHER PUBLICATIONS

Extended European Search Report issued in corresponding European Application No. 18843298.3, dated Jun. 30, 2020, 9 pages.

(Continued)

*Primary Examiner* — J. Christopher Ball
(74) *Attorney, Agent, or Firm* — Hamre, Schumann, Mueller & Larson, P.C.

(57) ABSTRACT

The present invention provides a method for accurately measuring a blood component despite uneven distribution of blood introduced into a capillary. The measurement method according to the present invention is characterized in that a plurality of electrode systems for measuring the hematocrit are provided in a capillary of a biosensor to measure the hematocrit at different positions in the capillary. By measuring the hematocrit at the plurality of positions in the capillary as described above, the hematocrit can be measured more accurately despite uneven distribution of blood introduced into the capillary.

24 Claims, 19 Drawing Sheets

(56) References Cited

U.S. PATENT DOCUMENTS

| | | |
|---|---|---|
| 2013/0341186 A1 | 12/2013 | Hsu |
| 2014/0224672 A1 | 8/2014 | Hsu |
| 2015/0323489 A1 | 11/2015 | Fujiwara et al. |
| 2016/0108451 A1 | 4/2016 | Fujiwara et al. |
| 2016/0186229 A1 | 6/2016 | Hall |
| 2016/0273017 A1 | 9/2016 | Fujiwara et al. |

FOREIGN PATENT DOCUMENTS

| | | |
|---|---|---|
| JP | 2013-257319 | 12/2013 |
| WO | 01/36953 | 5/2001 |
| WO | 2005/103669 | 11/2005 |
| WO | 2013/030369 | 3/2013 |
| WO | 2014/091682 | 6/2014 |
| WO | 2015/004900 | 1/2015 |
| WO | 2015/079635 | 6/2015 |
| WO | 2016/207644 | 12/2016 |

OTHER PUBLICATIONS

International Search Report issued in International Application No. PCT/JP2018/029303, filed Oct. 23, 2018, 5 pages with translation.
Office Action issued in corresponding European Patent Application No. 18843298.3, dated Jul. 8, 2022, 4 pages.

(a)
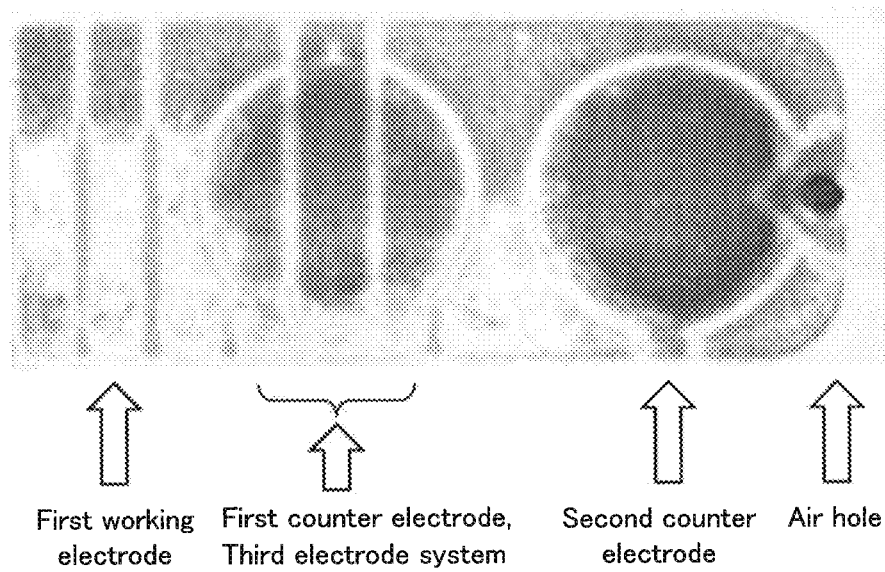
First working electrode | First counter electrode, Third electrode system | Second counter electrode | Air hole
(b)
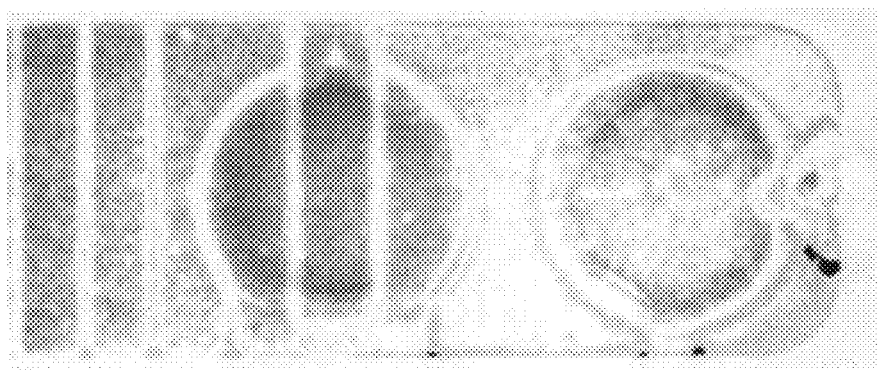
FIG. 1

| Step | | Working electrode | Counter electrode | Applied voltage (mV) | Application time (sec) | Non-application time (sec) | Accumulated time (sec) |
|---|---|---|---|---|---|---|---|
| Third step | Glu-1 | C | E,D | 400 | 0.5 | | 0.5 |
| | | | | | | 1.0 | 1.5 |
| Third step | Glu-1 | C | E,D | 400 | 0.5 | | 2.0 |
| | | | | | | 1.0 | 3.0 |
| Third step | Glu-1 | C | E,D | 400 | 0.5 | | 3.5 |
| | | | | | | 1.0 | 4.5 |
| Third step | Glu-1 | C | E,D | 400 | 0.5 | | 5.0 |
| | | | | | | 1.0 | 6.0 |
| Third step | Glu-1 | C | E,D | 400 | 0.5 | | 6.5 |
| | | | | | | 0.1 | 6.6 |
| Second step | Hct-1 | F | A,G | 2500 | 0.2 | | 6.8 |
| First step | Hct-2 | F | C,E,D | 2500 | 0.2 | | 7.0 |

FIG. 7

| | | Working electrode | | Counter electrode | |
|---|---|---|---|---|---|
| First electrode system | Hct-2 | First | F | First | C,E,D |
| Second electrode system | Hct-1 | First | F | Second | A,G |
| Third electrode system | Glu-1 | Third | C | Third | E,D |

FIG. 8

| Step | | Working electrode | Counter electrode | Applied voltage (mV) | Application time (sec) | Non-application time (sec) | Accumulated time (sec) |
|---|---|---|---|---|---|---|---|
| Third step | Glu-1 | C | E,D | 500 | 0.5 | | 0.5 |
| | | | | | | 0.2 | 0.7 |
| | | | | | | 0.3 | 1.0 |
| Fourth step | Glu-2 | A | G | 500 | 0.4 | | 1.4 |
| Third step | Glu-1 | C | E,D | 200 | 0.4 | | 1.8 |
| | | | | | | 0.4 | 2.2 |
| Fourth step | Glu-2 | A | G | 500 | 0.4 | | 2.6 |
| Third step | Glu-1 | C | E,D | 300 | 0.4 | | 3.0 |
| | | | | | | 0.2 | 3.2 |
| | | | | | | 0.2 | 3.4 |
| Fourth step | Glu-2 | A | G | 500 | 0.4 | | 3.8 |
| Third step | Glu-1 | C | E,D | 400 | 0.4 | | 4.2 |
| | | | | | | 0.4 | 4.6 |
| Fourth step | Glu-2 | A | G | 500 | 0.9 | | 5.5 |
| Third step | Glu-1 | C | E,D | 400 | 0.9 | | 6.4 |
| | | | | | | 0.2 | 6.6 |
| Second step | Hct-1 | F | A,G | 2500 | 0.2 | | 6.8 |
| First step | Hct-2 | F | C,E,D | 2500 | 0.2 | | 7.0 |

FIG. 13

| | | | Working electrode | | Counter electrode | |
|---|---|---|---|---|---|---|
| First electrode system | Hct-2 | First | F | First | C,E,D |
| Second electrode system | Hct-1 | First | F | Second | A,G |
| Third electrode system | Glu-1 | Third | C | Third | E,D |
| Fourth electrode system | Glu-2 | Fourth | A | Fourth | G |

FIG. 14

| Step | | Working electrode | Counter electrode | Applied voltage (mV) | Application time (sec) | Non-application time (sec) | Accumulated time (sec) |
|---|---|---|---|---|---|---|---|
| Third step | Glu-1 | C | E,D | 400 | 0.5 | | 0.5 |
| | | | | | | 0.2 | 0.7 |
| | | | | | | 0.3 | 1.0 |
| Fourth step | Glu-2 | A | G | 400 | 0.4 | | 1.4 |
| Third step | Glu-1 | C | E,D | 400 | 0.4 | | 1.8 |
| | | | | | | 0.4 | 2.2 |
| Fourth step | Glu-2 | A | G | 400 | 0.4 | | 2.6 |
| Third step | Glu-1 | C | E,D | 400 | 0.4 | | 3.0 |
| | | | | | | 0.2 | 3.2 |
| | | | | | | 0.2 | 3.4 |
| Fourth step | Glu-2 | A | G | 400 | 0.4 | | 3.8 |
| Third step | Glu-1 | C | E,D | 400 | 0.4 | | 4.2 |
| | | | | | | 0.4 | 4.6 |
| Fourth step | Glu-2 | A | G | 400 | 0.9 | | 5.5 |
| Third step | Glu-1 | C | E,D | 400 | 0.9 | | 6.4 |
| | | | | | | 0.2 | 6.6 |
| Second step | Hct-1 | F | A,G | 2500 | 0.2 | | 6.8 |
| First step | Hct-2 | F | C,E,D | 2500 | 0.2 | | 7.0 |

FIG. 16

| | | Working electrode | | Counter electrode | |
|---|---|---|---|---|---|
| First electrode system | Hct-2 | First | F | First | C,E,D |
| Second electrode system | Hct-1 | First | F | Second | A,G |
| Third electrode system | Glu-1 | Third | C | Third | E,D |
| Fourth electrode system | Glu-2 | Fourth | A | Fourth | G |

FIG. 17

| Step | | Working electrode | Counter electrode | Applied voltage (mV) | Application time (sec) | Non-application time (sec) | Accumulated time (sec) |
|---|---|---|---|---|---|---|---|
| Fourth step | Glu-2 | A | G | 500 | 0.5 | | 0.5 |
| Third step | Glu-1 | C | E,D | 500 | | | |
| | | | | | | 1.0 | 1.5 |
| Fourth step | Glu-2 | A | G | 500 | 0.5 | | 2.0 |
| Third step | Glu-1 | C | E,D | 500 | | | |
| | | | | | | 1.0 | 3.0 |
| Fourth step | Glu-2 | A | G | 500 | 0.5 | | 3.5 |
| Third step | Glu-1 | C | E,D | 500 | | | |
| | | | | | | 1.0 | 4.5 |
| Fourth step | Glu-2 | A | G | 500 | 0.5 | | 5.0 |
| Third step | Glu-1 | C | E,D | 500 | | | |
| | | | | | | 1.0 | 6.0 |
| Fourth step | Glu-2 | A | G | 500 | 0.5 | | 6.5 |
| Third step | Glu-1 | C | E,D | 500 | | | |
| | | | | | | 0.1 | 6.6 |
| Second step | Hct-1 | F | A,G | 2500 | 0.2 | | 6.8 |
| First step | Hct-2 | F | C,E,D | 2500 | 0.2 | | 7.0 |

FIG. 19

| | | Working electrode | | Counter electrode | |
|---|---|---|---|---|---|
| First electrode system | Hct-2 | First | F | First | C,E,D |
| Second electrode system | Hct-1 | First | F | Second | A,G |
| Third electrode system | Glu-1 | Third | C | Third | E,D |
| Fourth electrode system | Glu-2 | Fourth | A | Fourth | G |

FIG. 20

| Step | | Working electrode | Counter electrode | Applied voltage (mV) | Application time (sec) | Non-application time (sec) | Accumulated time (sec) |
|---|---|---|---|---|---|---|---|
| Third step | Glu-1 | C | E,D | 500 | 0.5 | | 0.5 |
| Fifth step | Hct-3 | F | G | 2500 | 0.2 | | 0.7 |
| | | | | | | 0.3 | 1.0 |
| Fourth step | Glu-2 | A | G | 500 | 0.4 | | 1.4 |
| Third step | Glu-1 | C | E,D | 200 | 0.4 | | 1.8 |
| | | | | | | 0.4 | 2.2 |
| Fourth step | Glu-2 | A | G | 500 | 0.4 | | 2.6 |
| Third step | Glu-1 | C | E,D | 300 | 0.4 | | 3.0 |
| Fifth step | Hct-3 | F | G | 2500 | 0.2 | | 3.2 |
| | | | | | | 0.2 | 3.4 |
| Fourth step | Glu-2 | A | G | 500 | 0.4 | | 3.8 |
| Third step | Glu-1 | C | E,D | 400 | 0.4 | | 4.2 |
| | | | | | | 0.4 | 4.6 |
| Fourth step | Glu-2 | A | G | 500 | 0.9 | | 5.5 |
| Third step | Glu-1 | C | E,D | 400 | 0.9 | | 6.4 |
| | | | | | | 0.2 | 6.6 |
| Second step | Hct-1 | F | A,G | 2500 | 0.2 | | 6.8 |
| First step | Hct-2 | F | C,E,D | 2500 | 0.2 | | 7.0 |

FIG. 22

| | | Working electrode | | Counter electrode | |
|---|---|---|---|---|---|
| First electrode system | Hct-2 | First | F | First | C,E,D |
| Second electrode system | Hct-1 | First | F | Second | A,G |
| Third electrode system | Glu-1 | Third | C | Third | E,D |
| Fourth electrode system | Glu-2 | Fourth | A | Fourth | G |
| Fifth electrode system | Hct-3 | First | F | Fourth | G |

FIG. 23

| Step | | Working electrode | Counter electrode | Applied voltage (mV) | Application time (sec) | Non-application time (sec) | Accumulated time (sec) |
|---|---|---|---|---|---|---|---|
| Third step | Glu-1 | C | E,D | 400 | 0.5 | | 0.5 |
| Fifth step | Hct-3 | F | G | 2500 | 0.2 | | 0.7 |
| | | | | | | 0.3 | 1.0 |
| Fourth step | Glu-2 | A | G | 400 | 0.4 | | 1.4 |
| Third step | Glu-1 | C | E,D | 400 | 0.4 | | 1.8 |
| | | | | | | 0.4 | 2.2 |
| Fourth step | Glu-2 | A | G | 400 | 0.4 | | 2.6 |
| Third step | Glu-1 | C | E,D | 400 | 0.4 | | 3.0 |
| Fifth step | Hct-3 | F | G | 2500 | 0.2 | | 3.2 |
| | | | | | | 0.2 | 3.4 |
| Fourth step | Glu-2 | A | G | 400 | 0.4 | | 3.8 |
| Third step | Glu-1 | C | E,D | 400 | 0.4 | | 4.2 |
| | | | | | | 0.4 | 4.6 |
| Fourth step | Glu-2 | A | G | 400 | 0.9 | | 5.5 |
| Third step | Glu-1 | C | E,D | 400 | 0.9 | | 6.4 |
| | | | | | | 0.2 | 6.6 |
| Second step | Hct-1 | F | A,G | 2500 | 0.2 | | 6.8 |
| First step | Hct-2 | F | C,E,D | 2500 | 0.2 | | 7.0 |

FIG. 25

| | | | Working electrode | | Counter electrode | |
|---|---|---|---|---|---|---|
| First electrode system | Hct-2 | First | F | First | C,E,D |
| Second electrode system | Hct-1 | First | F | Second | A,G |
| Third electrode system | Glu-1 | Third | C | Third | E,D |
| Fourth electrode system | Glu-2 | Fourth | A | Fourth | G |
| Fifth electrode system | Hct-3 | First | F | Fourth | G |

FIG. 26

METHOD FOR MEASURING AMOUNT OF BLOOD COMPONENT IN BLOOD

TECHNICAL FIELD

The present invention relates to a method for measuring the amount of a blood component in blood.

BACKGROUND ART

Sensors for measuring a component of a biological sample have been used conventionally in, for example, clinical examinations and self-measurement of blood glucose levels of diabetic patients. Such sensors have a configuration in which, for example, a cover is disposed on an insulating substrate, which has a working electrode and a counter electrode formed on its surface, via a spacer. A reagent containing an oxidoreductase, a mediator (electron mediator), and the like is placed on the working electrode and the counter electrode, and this portion serves as an analysis portion. One end of a channel for introducing blood is in communication with the analysis portion, and the other end of the channel is open to the outside to serve as a blood supply port. Analysis of a component (e.g., blood glucose level) of a biological sample (e.g., blood) using such a sensor is performed in the following manner, for example. First, the sensor is set in a dedicated measuring device (meter). Then, a fingertip or the like is pricked with a lancet to cause bleeding, and the blood supply port of the sensor is brought into contact therewith. The blood is drawn into the channel of the sensor by capillary action, introduced into the analysis portion through the channel, and then comes into contact with the reagent in the analysis portion. Then, the component in the blood reacts with the oxidoreductase to cause an oxidation-reduction reaction, thereby causing a current to flow through the mediator. This current is detected, and based on the thus-obtained current value, the measuring device calculates the amount of the blood component and displays it.

To address growing demands for health monitoring, demand for highly accurate sensors for measuring a component of a biological sample has increased year by year. For example, ISO 15197 (In vitro diagnostic test systems—Requirements for blood-glucose monitoring systems for self-testing in managing diabetes mellitus) that came into effect in May 2013 provides standards that are stricter than those in ISO 15197 that came into effect in 2003.

TABLE 1

| ISO 15197 (2013) | ISO 15197 (2003) |
|---|---|
| 95% of results displayed by a blood glucose meter have to be within the following range: ±15 mg/dl at glucose concentrations of less than 100 mg/dl, and within ±15% at glucose concentrations of 100 mg/dl or more | 95% of results displayed by a blood glucose meter have to be within the following range: ±15 mg/dl at glucose concentrations of less than 75 mg/dl, and within ±20% at glucose concentrations of 75 mg/dl or more |

As an example of a biosensor for performing highly accurate measurement, a biosensor was reported in which a reagent layer 39 is disposed on an electrode system including a working electrode 32 and a counter electrode 36 and another reagent layer 40 is disposed on an electrode system including a working electrode 33 and a counter electrode 35 (Patent Document 1). Another electrode 37 is an electrode for measuring the hematocrit, and the reagent layers 39 and 40 are not in contact with the electrode 37. The reagent layer 39 contains an oxidoreductase and a mediator, and the reagent layer 40 contains a mediator. The hematocrit can be measured by applying a voltage to the above-described electrode 37 and any one of the working electrode 32, the counter electrode 36, the working electrode 33, and the counter electrode 35.

Also, a biosensor in which a reagent is disposed on three electrodes (working electrodes W1 and W2 and a reference electrode R) has been reported (Patent Document 2). An oxidized redox mediator is disposed on the working electrode W1 and the reference electrode R, and an oxidized redox mediator and an enzyme are disposed on the working electrode W2. By applying a voltage between the above-described working electrode W1 and reference electrode R, the resistance value (r value) is measured, and the hematocrit can be calculated using the r value.

CITATION LIST

Patent Documents

Patent Document 1: WO 2005/103669
Patent Document 2: JP 4060078 B2

DISCLOSURE OF INVENTION

Problem to be Solved by the Invention

Heretofore, in order to achieve highly accurate measurement of a blood component, the hematocrit (Hct) of blood introduced into a capillary of a biosensor is measured, and the amount of the blood component is corrected based on this value.

However, according to conventional techniques, blood introduced into a capillary is distributed unevenly and this makes it difficult to measure a blood component accurately using conventional measurement methods using such a biosensor.

Means for Solving Problem

The inventors of the present invention conducted in-depth studies on uneven distribution of blood introduced into a capillary, and made the findings illustrated with reference to FIG. 1. FIG. 1 shows images for illustrating uneven distribution of blood in a biosensor after the blood is introduced into the biosensor, which has two reagent portions. In (*a*) and (*b*) of FIG. 1, the left side as viewed is the side on which blood is applied as a spot, and the right side as viewed is the side on which an air hole is provided. Blood moves from left to right as viewed in these images. In FIG. 1, portions where a large number of erythrocytes are present are colored black, and portions where a small number of erythrocytes are present are colored gray. In (*a*) of FIG. 1, a reagent portion on the side on which blood is applied as a spot is colored gray, and it can be seen that the proportion of plasma components is large and the proportion of erythrocytes is small in this reagent portion. On the other hand, in (*b*) of FIG. 1, a reagent portion on the side provided with the air hole is colored gray, and it can be seen that the proportion of plasma components is large and the proportion of erythrocytes is small in this reagent portion. As described above, there is a problem in that, owing to uneven distribution of erythrocytes in the reagent portions of the biosensor, the hematocrit of the entire capillary cannot be measured appropriately. In light of the above-described problem, the inventors of the present invention have developed a method, which includes specific measuring steps, for measuring the amount of a blood component in blood with high accuracy using a biosensor with a specific configuration.

In conventional measurement methods, an electrode system for measuring the hematocrit is provided in a capillary of a biosensor, and the hematocrit is measured using the electrode system. The measurement method according to the present invention is characterized in that a plurality of electrode systems for measuring the hematocrit are provided in a capillary of a biosensor to measure the hematocrit at different positions in the capillary of the biosensor. By measuring the hematocrit at a plurality of positions in the capillary as described above, the hematocrit can be measured more accurately despite uneven distribution of the blood introduced into the capillary.

The present invention provides a method for measuring the amount of a blood component in blood using a biosensor,
the biosensor including:
a first electrode system for measuring a hematocrit-dependent current value, the first electrode system including a first working electrode and a first counter electrode;
a second electrode system fir measuring a hematocrit-dependent current value, the second electrode system including the first working electrode and a second counter electrode; and
a third electrode system for measuring a blood component amount-dependent current value, the third electrode system including a third working electrode and a third counter electrode,
wherein a first reagent layer is disposed on the second counter electrode,
a second reagent layer is disposed on the third working electrode and the third counter electrode,
the first reagent layer and the second reagent layer are disposed spaced apart from each other,
the first reagent layer and the second reagent layer are not disposed on the first working electrode,
the first counter electrode and the second counter electrode are disposed spaced apart from each other,
at least one of the third working electrode and the third counter electrode is used as the first counter electrode, and
the second reagent layer contains a reagent for measuring the amount of the blood component in the blood,
the method including:
a first step of applying a first voltage to the first electrode system and detecting a first hematocrit-dependent current value;
a second step of applying a second voltage to the second electrode system and detecting a second hematocrit-dependent current value;
a third step of applying a third voltage to the third electrode system and detecting a blood component amount-dependent current value; and
a step of calculating the amount of the blood component using the blood component amount-dependent current value, the first hematocrit-dependent current value, and the second hematocrit-dependent current value (the method may also be referred to as a "blood component amount measurement method 1" in the present specification).

The present invention also provides a method for measuring the amount of a blood component in blood using a biosensor,
the biosensor including:
a first electrode system for measuring a hematocrit-dependent current value, the first electrode system including a first, working electrode and a first counter electrode;
a second electrode system for measuring a hematocrit-dependent current value, the second electrode system including the first working electrode and a second counter electrode;
a third electrode system for measuring a blood component amount-dependent current value, the third electrode system including a third working electrode and a third counter electrode; and
a fourth electrode system for measuring a blood component amount-dependent current value, the fourth electrode system including a fourth working electrode and a fourth counter electrode,
wherein a second reagent layer is disposed on the third working electrode and the third counter electrode,
a third reagent layer is disposed on the fourth working electrode and the fourth counter electrode,
the second reagent layer and the third reagent layer are disposed spaced apart from each other,
the second reagent layer and the third reagent layer are not disposed on the first working electrode,
the first counter electrode and the second counter electrode are disposed spaced apart from each other,
at least one of the third working electrode and the third counter electrode is used as the first counter electrode,
at least one of the fourth working electrode and the fourth counter electrode is used as the second counter electrode, and
the second reagent layer and the third reagent layer each contain a reagent for measuring the amount of the blood component in the blood,
the method including:
a first step of applying a first voltage to the first electrode system and detecting a first hematocrit-dependent current value;
a second step of applying a second voltage to the second electrode system and detecting a second hematocrit-dependent current value;
a third step of applying a third voltage to the third electrode system and detecting a first blood component amount-dependent current value;
a fourth step of applying a fourth voltage to the fourth electrode system and detecting a second blood component amount-dependent current value; and
a step of calculating the amount of the blood component using the first blood component amount-dependent current value, the second blood component amount-dependent current value, the first hematocrit-dependent current value, and the second hematocrit-dependent current value (the method may also be referred to as a "blood component amount measurement method 2I" in the present specification).

Effects of the Invention

As described above, in the method for measuring a blood component according to the present invention, the reagent portions and the electrodes are configured so as to solve the problem of uneven distribution of blood in a biosensor. Accordingly, by applying voltages to the plurality of electrode systems, measurement can be performed in consideration of uneven distribution of blood. Therefore, the measurement method according to the present invention improves the measurement accuracy even if the blood distribution in a biosensor is uneven.

In the present specification, when a "method for measuring a blood component" is simply referred to, it refers to all of the above-described "blood component amount measurement method 1" and "blood component amount measurement method 2I" and the following "blood component amount measurement method 2II", "blood component amount measurement method 2A", "blood component amount measurement method 2B", "blood component amount measurement method 2C", "blood component amount measurement method 2D", and "blood component amount measurement method 2E".

BRIEF DESCRIPTION OF DRAWINGS

FIG. 1(a) and (b) in FIG. 1 are images for illustrating uneven distribution of blood in a capillary of a biosensor having an electrode configuration according to the present invention.

FIG. 7 is a table showing electrodes, the applied voltage, the timing of voltage application, and the application time in the voltage application pattern in Embodiment 1.

FIG. 8 is a table showing electrodes and electrode systems in a biosensor used in Embodiment 1.

FIG. 13 is a table showing electrodes, the applied voltage, the timing of voltage application, and the application time in the voltage application pattern in Embodiment 2A.

FIG. 14 is a table showing electrodes and electrode systems in a biosensor used in Embodiment 2A.

FIG. 16 is a table showing electrodes, the applied voltage, the timing of voltage application, and the application time in the voltage application pattern in Embodiment 2B.

FIG. 17 is a table showing electrodes and electrode systems in a biosensor used in Embodiment 2B.

FIG. 19 is a table showing electrodes, the applied voltage, the timing of voltage application, and the application time in the voltage application pattern in Embodiment 2C.

FIG. 20 is a table showing electrodes and electrode systems in a biosensor used in Embodiment 2C.

FIG. 22 is a table showing electrodes, the applied voltage, the timing of voltage application, and the application time in the voltage application pattern in Embodiment 2D.

FIG. 23 is a table showing electrodes and electrode systems in a biosensor used in Embodiment 2D.

FIG. 25 is a table showing electrodes, the applied voltage, the timing of voltage application, and the application time in the voltage application pattern in Embodiment 2E.

FIG. 26 is a table showing electrodes and electrode systems in a biosensor used in Embodiment 2E.

DESCRIPTION OF THE INVENTION

Figure 2:
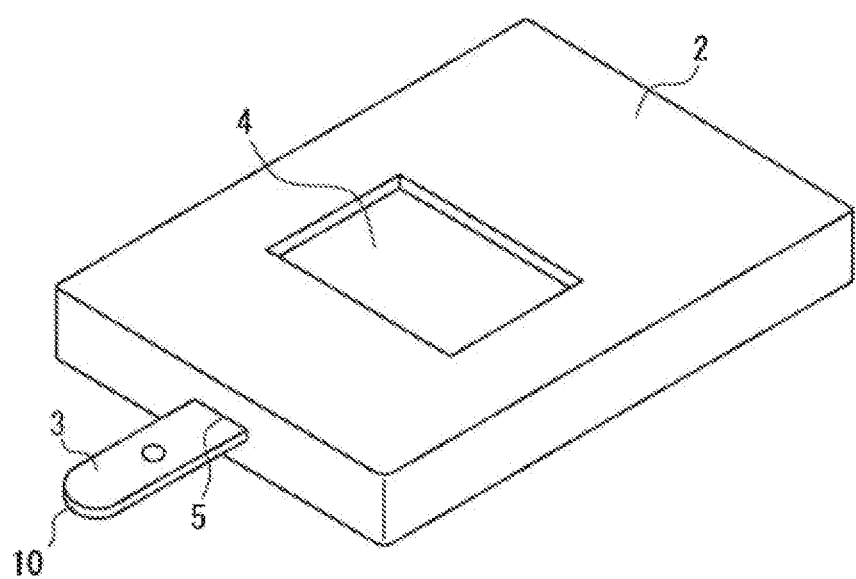
FIG. 2 is a perspective view showing an example of a measuring device used in a measurement method of the present invention.

Next, the present invention will be described in detail.

In the blood component amount measurement methods 1 and 2 of the present invention, examples of a component to be measured include glucose, ketone, HbA1c, lactic acid, uric acid, bilirubin, and cholesterol. In the biosensor used in the measurement method of the present invention, an enzyme to be contained in the reagent portions is selected as appropriate according to a component to be measured in a biological sample.

Embodiment 1: Blood Component Amount Measurement Method 1

The present invention provides a method for measuring the amount of a blood component in blood using a biosensor,
the biosensor including:
a first electrode system for measuring a hematocrit-dependent current value, the first electrode system including a first working electrode and a first counter electrode;
a second electrode system for measuring a hematocrit-dependent current value, the second electrode system including the first working electrode and a second counter electrode; and
a third electrode system for measuring a blood component amount-dependent current value, the third electrode system including a third working electrode and a third counter electrode,
wherein a first reagent layer is disposed on the second counter electrode,
a second reagent layer is disposed on the third working electrode and the third counter electrode,
the first reagent layer and the second reagent layer are disposed spaced apart from each other,
the first reagent layer and the second reagent layer are not disposed on the first working electrode,
the first counter electrode and the second counter electrode are disposed spaced apart from each other,
at least one of the third working electrode and the third counter electrode is used as the first counter electrode, and
the second reagent layer contains a reagent for measuring the amount of the blood component in the blood,
the method including:
a first step of applying a first voltage to the first electrode system and detecting a first hematocrit-dependent current value;

a second step of applying a second voltage to the second electrode system and detecting a second hematocrit-dependent current value;

a third step of applying a third voltage to the third electrode system and detecting a blood component amount-dependent current value; and a step of calculating the amount of the blood component using the blood component amount-dependent current value, the first hematocrit-dependent current value, and the second hematocrit-dependent current value (the blood component amount measurement method 1).

In the blood component amount measurement method 1, the third step may be performed at least twice, and two or more blood component amount-dependent current values obtained may be used as the blood component amount-dependent current values in the step of calculating the amount of the blood component.

In the blood component amount measurement method 1, it is preferable that the first step and the second step are performed after the third step. This is because, since the step of detecting the blood component amount-dependent current value is complete, either of the working electrode and the counter electrode in the third electrode system used in the step of detecting the blood component amount-dependent current value can be used as the counter electrodes of the electrode systems to be used when detecting the first hematocrit-dependent current value and the second hematocrit-dependent current value.

In the blood component amount measurement method 1, it is preferable that the first reagent layer and the second reagent layer each contain a mediator. The mediator is not particularly limited, and may be, for example, a ferricyanide, p-benzoquinone, a p-benzoquinone derivative, phenazine methosulfate, methylene blue, ferrocene, or a ferrocene derivative. Of these, phenanthrenequinone (9,10-phenanthrenequinone), 3-phenylimino-3H-phenothiazine, or a ferricyanide (potassium ferricyanide) is preferable. The amount of mediator to be mixed is not particularly limited, and is, for example, 0.1 to 1000 mM, preferably 1 to 500 mM, and more preferably 10 to 300 mM per measurement or per biosensor. For example, when a glucose level (blood component) in blood (biological sample) is to be measured, in the case of a biosensor in which glucose dehydrogenase (oxidoreductase) is used as an enzyme and potassium ferricyanide is used as a mediator, a Glu-dependent current value is obtained in the following manner, for example. In the biosensor, the blood comes into contact with the oxidoreductase and the mediator, and the oxidoreductase and the mediator are dissolved in the blood. Then, an enzyme reaction proceeds between Glu, which is a substrate in the blood, and the oxidoreductase, whereby the mediator is reduced to produce a ferrocyanide. Upon completion of this reaction, the reduced mediator is electrochemically oxidized, and from the current obtained at this time, a current value that depends on Glu in the blood is obtained.

In the blood component amount measurement method 1, it is preferable that the second reagent layer further contains an oxidoreductase. The oxidoreductase is selected as appropriate according to the blood component to be measured. Examples of the oxidoreductase include glucose oxidase, lactate oxidase, cholesterol oxidase, bilirubin oxidase, glucose dehydrogenase, and lactate dehydrogenase. When the blood component to be measured is glucose, glucose oxidase and glucose dehydrogenase are preferable as the oxidoreductase. The amount of the oxidoreductase is, for example, 0.01 to 100 U, preferably 0.05 to 10 U, and more preferably 0.1 to 5 U per biosensor or per measurement.

In the blood component amount measurement method 1, the first voltage is, for example, 1 V to 5 V, preferably 1.5 V to 4.5 V, and more preferably 2 V to 4 V. The application time of the first voltage is, for example, 0.05 to 5 seconds, preferably 0.1 to 3 seconds, and more preferably 0.5 to 2 seconds.

In the blood component amount measurement method 1, the second voltage is, for example, 1 V to 5 V, preferably 1.5 V to 4.5 V, and more preferably 2 V to 4 V. The application time of the second voltage is, for example, 0.05 to 5 seconds, preferably 0.1 to 3 seconds, and more preferably 0.5 to 2 seconds.

In the blood component amount measurement method 1, the third voltage is, for example, 0.1 V to 3 V, preferably 0.2 V to 2 V, and more preferably 0.3 V to 1.5 V. The application time of the third voltage is, for example, 0.05 to 5 seconds, preferably 0.1 to 3 seconds, and more preferably 0.5 to 2 seconds.

In the blood component amount measurement method 1, the first voltage and the third voltage preferably satisfy the following relationship: the third voltage<the first voltage. The second voltage and the third voltage may satisfy the following relationship: the third voltage<the second voltage. In the blood component amount measurement method 1, the following relationship may be satisfied: the application time of the first voltage<the application time of the third voltage. Also, the following relationship may be satisfied: the application time of the second voltage<the application time of the third voltage.

In the blood component amount measurement method 1, the first voltage is, for example, 1 V to 5 V, preferably 1.5 V to 4.5 V, and more preferably 2 V to 4 V; the second voltage is, for example, 1 V to 5 V, preferably 1.5 V to 4.5 V, and more preferably 2 V to 4 V; the third voltage is, for example, 0.1 V to 3 V, preferably 0.2 V to 2 V, and more preferably 0.3 V to 1.5 V; the following relationships are satisfied: e.g., the third voltage<the first voltage, and also, e.g., the third voltage<the second voltage; the application time of the first voltage is, for example, 0.05 to 5 seconds, preferably 0.1 to 3 seconds, and more preferably 0.5 to 2 seconds; the application time of the second voltage is, for example, 0.05 to 5 seconds, preferably 0.1 to 3 seconds, and more preferably 0.5 to 2 seconds; the application time of the third voltage is, for example, 0.05 to 5 seconds, preferably 0.1 to 3 seconds, and more preferably 0.5 to 2 seconds; and the following relationships are satisfied: the application time of the first voltage<the application time of the third voltage and also the application time of the second voltage<the application time of the third voltage.

Embodiment 2: Blood Component Amount Measurement Method 2I

The present invention also provides a method for measuring the amount of a blood component in blood using a biosensor, the biosensor including:

a first electrode system for measuring a hematocrit-dependent current value, the first electrode system including a first working electrode and a first counter electrode;

a second electrode system for measuring a hematocrit-dependent current value, the second electrode system including the first working electrode and a second counter electrode;

a third electrode system for measuring a blood component amount-dependent current value, the third electrode system including a third working electrode and a third counter electrode; and a fourth electrode system for measuring a blood component amount-dependent current value, the fourth electrode system including a fourth working electrode and a fourth counter electrode, wherein a second reagent layer is disposed on the third working electrode and the third counter electrode, a third reagent layer is disposed on the fourth working electrode and the fourth counter electrode, the second reagent layer and the third reagent layer are disposed spaced apart from each other, the second reagent layer and the third reagent layer are not disposed on the first working electrode, the first counter electrode and the second counter electrode are disposed spaced apart from each other, at least one of the third working electrode and the third counter electrode is used as the first counter electrode, at least one of the fourth working electrode and the fourth counter electrode is used as the second counter electrode, and the second reagent layer and the third reagent layer each contain a reagent for measuring the amount of the blood component in the blood, the method including:

a first step of applying a first voltage to the first electrode system and detecting a first hematocrit-dependent current value;

a second step of applying a second voltage to the second electrode system and detecting a second hematocrit-dependent current value;

a third step of applying a third voltage to the third electrode system and detecting a first blood component amount-dependent current value;

a fourth step of applying a fourth voltage to the fourth electrode system and detecting a second blood component amount-dependent current value; and a step of calculating the amount of the blood component using the first blood component amount-dependent current value, the second blood component amount-dependent current value, the first hematocrit-dependent current value, and the second hematocrit-dependent current value (the blood component amount measurement method 2I).

In the blood component amount measurement method 2I, it is preferable that the first step and the second step are performed after the third step and the fourth step. This is because, since the step of detecting the blood component amount-dependent current values is complete, any of the working electrodes and the counter electrodes in the third electrode system and the fourth electrode system used in the step of detecting the blood component amount-dependent current values can be used as the counter electrodes of the electrode systems to be used when detecting the first hematocrit-dependent current value and the second hematocrit-dependent current value.

In the blood component amount measurement method 2I, the third step may be performed at least twice, and two or more first blood component amount-dependent current values obtained may be used as the first blood component amount-dependent current values in the step of calculating the amount of the blood component.

In the blood component amount measurement method 2I, the first voltage is, for example, 1 V to 5 V, preferably 1.5 V to 4.5 V, and more preferably 2 V to 4 V. The application time of the first voltage is, for example, 0.05 to 5 seconds, preferably 0.1 to 3 seconds, and more preferably 0.5 to 2 seconds.

In the blood component amount measurement method 2I, the second voltage is, for example, 1 V to 5 V, preferably 1.5 V to 4.5 V, and more preferably 2 V to 4 V. The application time of the second voltage is, for example, 0.05 to 5 seconds, preferably 0.1 to 3 seconds, and more preferably 0.5 to 2 seconds.

In the blood component amount measurement method 2I, the third voltage is, for example, 0.1 V to 3 V, preferably 0.2 V to 2 V, and more preferably 0.3 V to 1.5 V. The application time of the third voltage is, for example, 0.05 to 5 seconds, preferably 0.1 to 3 seconds, and more preferably 0.5 to 2 seconds.

In the blood component amount measurement method 2I, the fourth voltage is, for example, 0.1 V to 3 V, preferably 0.2 V to 2 V, and more preferably 0.3 V to 1.5 V. The application time of the third voltage is, for example, 0.05 to 5 seconds, preferably 0.1 to 3 seconds, and more preferably 0.5 to 2 seconds.

In the blood component amount measurement method 2I, the first voltage and the third voltage preferably satisfy the following relationship: the third voltage<the first voltage. The second voltage and the third voltage preferably satisfy the following relationship: the third voltage<the second voltage.

In the blood component amount measurement method 2I, the first voltage and the fourth voltage preferably satisfy the following relationship: the fourth voltage<the first voltage. The second voltage and the fourth voltage preferably satisfy the following relationship: the fourth voltage<the second voltage.

In the blood component amount measurement method 2I, the following relationship preferably is satisfied: the application time of the first voltage<the application time of the third voltage. Also, the following relationship preferably is satisfied: the application time of the second voltage<the application time of the third voltage.

In the blood component amount measurement method 2I, the following relationship preferably is satisfied: the application time of the first voltage<the application time of the fourth voltage. Also, the following relationship preferably is satisfied: the application time of the second voltage<the application time of the fourth voltage.

In the blood component amount measurement method 1, the first voltage is, for example, 1 V to 5 V, preferably 1.5 V to 4.5 V, and more preferably 2 V to 4 V; the second voltage is, for example, 1 V to 5 V, preferably 1.5 V to 4.5 V, and more preferably 2 V to 4 V; the third voltage is, for example, 0.1 V to 3 V, preferably 0.2 V to 2 V, and more preferably 0.3 V to 1.5 V; the fourth voltage is, for example, 0.1 V to 3 V, preferably 0.2 V to 2 V and more preferably 0.3 V to 1.5 V; the following relationships are satisfied: e.g., the third voltage<the first voltage and the fourth voltage<the first voltage, and also, e.g., the third voltage<the second voltage, the fourth voltage<the second voltage; the application time of the first voltage is, for example, 0.05 to 5 seconds, preferably 0.1 to 3 seconds, and more preferably 0.5 to 2 seconds; the application time of the second voltage is, for example, 0.05 to 5 seconds, preferably 0.1 to 3 seconds, and more preferably 0.5 to 2 seconds; the application time of the third voltage is, for example, 0.05 to 5 seconds, preferably 0.1 to 3 seconds, and more preferably 0.5 to 2 seconds; the application time of the fourth voltage is, for example, 0.05 to 5 seconds, preferably 0.1 to 3 seconds, and more preferably 0.5 to 2 seconds; and the following relationships are satisfied: the application time of the first voltage<the application time of the third voltage and the application time of the first voltage<the application time of the fourth voltage, and also, the application time of the second voltage<the application time of the third voltage and the application time of the second voltage<the application time of the fourth voltage.

(Blood Component Amount Measurement Method 2A)

A blood component amount measurement method 2A of the present invention corresponds to the blood component amount measurement method 2I in which the third step is performed at least twice, two or more first blood component amount-dependent current values obtained are used as the first blood component amount-dependent current values in the step of calculating the amount of the blood component, and in voltage application when the third step is performed at least twice, the third voltages are different from each other.

(Blood Component Amount Measurement Method 2B)

A blood component amount measurement method 2B of the present invention corresponds to the blood component amount measurement method 2I in which the third step is performed at least twice, two or more first blood component amount-dependent current values obtained are used as the first blood component amount-dependent current values in the step of calculating the amount of the blood component, and in voltage application when the third step is performed at least twice, the third voltages are equal to each other.

In the blood component amount measurement methods 2I, 2A, and 2B, it is preferable that the fourth step is performed at least twice and that two or more second blood component amount-dependent, current values obtained are used as the second blood component amount-dependent current values in the step of calculating the amount of the blood component. In this case, it is preferable that, in voltage application when the fourth step is performed at least twice, the fourth voltages are equal to each other. When the fourth voltages are equal to each other as described above, the transition of the response value (current value) on the time axis can be observed, for example.

In the blood component amount measurement method 2I configured such that the third step is performed at least twice and two or more first blood component amount-dependent current values obtained are used as the first blood component amount-dependent current values in the step of calculating the amount of the blood component and that the fourth step is performed at least twice and two or more second blood component amount-dependent current values obtained are used as the second blood component amount-dependent current values in the step of calculating the amount of the blood component, the third steps and the fourth steps may be performed alternately.

(Blood Component Amount Measurement Method 2C)

A blood component amount measurement method 2C of the present invention. corresponds to the blood component amount measurement method 2I in which the third step is performed at least twice and two or more first blood component amount-dependent current values obtained are used as the first blood component amount-dependent current values in the step of calculating the amount of the blood component, the fourth step is performed at least twice and two or more second blood component amount-dependent current values obtained are used as the second blood component amount-dependent current values in the step of calculating the amount of the blood component, and the third steps are performed at the same time as the fourth steps, respectively.

In the blood component amount measurement method 2C, in voltage application when the third step is performed at least twice, the third voltages may be different from each other.

In the blood component amount measurement method 2C, in voltage application when the third step is performed at least twice, the third voltages may be equal to each other.

In the blood component amount measurement method 2C, the third voltage and the fourth voltage may be equal to each other. In the third step and fourth step performed at least twice, the third voltage and the fourth voltage may be equal to each other in every step or in one or more steps.

(Blood Component Amount Measurement Method 2II)

The blood component amount measurement method 2II corresponds to the blood component amount measurement method 2C in which the biosensor further includes a fifth electrode system for measuring a hematocrit-dependent current value, the fifth electrode system including the first working electrode and the fourth counter electrode, the method further includes a fifth step of applying a fifth voltage to the fifth electrode system and detecting a third hematocrit-dependent current value, and the fifth step is performed at least once during a period in which neither the third step nor the fourth step is performed and prior to the first step and the second step.

(Blood Component Amount Measurement Method 2D)

A blood component amount measurement method 2D of the present invention corresponds to the blood component amount measurement method 2II in which the fifth step is performed at least twice, and the fifth voltages are equal to each other.

(Blood Component Amount Measurement Method 2E)

A blood component amount measurement method 2E of the present invention corresponds to the blood component amount measurement method 2II in which, in voltage application when the third step is performed at least twice, the third voltages are different from each other.

In the blood component amount measurement method 2II, in voltage application when the third step is performed at least twice, the third voltages may be equal to each other.

In the blood component amount measurement methods 2I, 2II, 2A, 2B, 2C, 2D), and 2E, it is preferable that the second reagent layer and the third reagent layer each contain a mediator. The mediator is not particularly limited, and may be, for example, a ferricyanide, p-benzoquinone, a p-benzoquinone derivative, phenazine methosulfate, methylene blue, ferrocene, or a ferrocene derivative. Of these, phenanthrenequinone (9,10-phenanthrenequinone), 3-phenylimino-3H-phenothiazine, or a ferricyanide (potassium ferricyanide) is preferable. The amount of mediator to be mixed is not particularly limited, and is, for example, 0.1 to 1000 mM, preferably 1 to 500 mM, and more preferably 10 to 300 mM per measurement or per biosensor.

In the blood component amount measurement methods 2I, 2II, 2A, 2B, 2C, 2D), and 2E, it is preferable that the second reagent layer and the third reagent layer each further contain an oxidoreductase. The oxidoreductase is selected as appropriate according to the blood component to be measured. Examples of the oxidoreductase include glucose oxidase, lactate oxidase, cholesterol oxidase, bilirubin oxidase, glucose dehydrogenase, and lactate dehydrogenase. When the blood component to be measured is glucose, glucose oxidase and glucose dehydrogenase are preferable as the oxidoreductase. The amount of the oxidoreductase is, for example, 0.01 to 100 U, preferably 0.05 to 10 U, and more preferably 0.1 to 5 U per biosensor or per measurement.

The biosensor used in the method for measuring the amount of a blood component according to the present invention includes predetermined electrode systems as described above. Preferably, this biosensor further includes an insulating substrate on which the respective electrode systems and a channel for introducing blood into the respective electrode systems are formed, and one end of the channel is open to the outside of the biosensor to serve as a blood supply port. In this case, the biosensor may be configured such that it has one blood supply port, the channel is branched at intermediate positions, and ends of the respective branched portions of the channel are in communication with respective analysis portions. Also, the biosensor may be configured such that the electrode systems are positioned at intermediate positions of the channel, and another electrode system is positioned rearward of these electrode systems.

The biosensor used in the method for measuring a blood component of the present invention is preferably configured such that it further includes a spacer and a cover, and the cover is disposed on the insulating substrate via the spacer.

In the biosensor used in the method for measuring a blood component of the present invention, when the reagent portions contain a mediator or contains a mediator and an oxidoreductase, it is preferable that the reagent portions further contain an enzyme stabilizer and/or a crystal homogenizing agent.

Examples of the enzyme stabilizer include sugar alcohols. Examples of the sugar alcohols include chain polyhydric alcohols and cyclic sugar alcohols, such as sorbitol, maltitol, xylitol, mannitol, lactitol, reduced palatinose, arabinitol, glycerol, ribitol, galactitol, sedoheptitol, perseitol, volemitol, styracitol, polygalitol, iditol, talitol, allitol, isylitol, saccharified reduced starch, and isylitol. Furthermore, stereoisomers, substitution products, or derivatives of these sugar alcohols may be used. These sugar alcohols may be used individually or two or more of them may be used together. Of these, maltitol is preferable. The amount of the enzyme stabilizer to be mixed is, for example, in the range from 0.1 to 500 mM, preferably in the range from 0.5 to 100 mM, and more preferably in the range from 1 to 50 mM per measurement or per sensor.

The crystal homogenizing agent is used to homogenize the crystal state in the reagent portions, and examples thereof include amino acids. Examples of the amino acids include glycine, alanine, valine, leucine, isoleucine, serine, threonine, methionine, asparagine, glutamine, arginine, lysine, histidine, phenylalanine, tryptophan, proline, sarcosine, betaine, and taurine, as well as salts, substitution products, and derivatives thereof. They may be used individually or two or more of them may be used together. Of these, glycine, serine, proline, threonine, lysine, and taurine are preferable, and taurine is more preferable. The amount of the crystal homogenizing agent to be mixed is, for example, 0.1 to 1000 mM, preferably 10 to 500 mM, and more preferably 20 to 200 mM per measurement or per sensor.

The biosensor used in the method for measuring the amount of a blood component according to the present invention is preferably configured such that it further includes a blood detection electrode, the blood detection electrode is positioned rearward of at least one of the respective electrode systems from the blood supply port, and introduction of blood into at least one of the respective electrode systems can be reliably detected by the blood detection electrode. More preferably, the blood detection electrode is positioned rearward of all the electrode systems. The blood detection electrode may be used as one of the electrode systems.

FIG. 2 is a perspective view showing an example of a measuring device with a biosensor used in the measurement method of the present invention being inserted thereinto. As shown in FIG. 2, this measuring device 2 has an insertion port 5 for a sensor at one end thereof, and a sensor 3 is inserted thereinto and held therein. Reference numeral 10 denotes a blood supply port of the sensor 3. The measuring device 2 has a display portion 4 approximately at the center thereof and a measurement result is displayed in the display portion 4.

Figure 27:
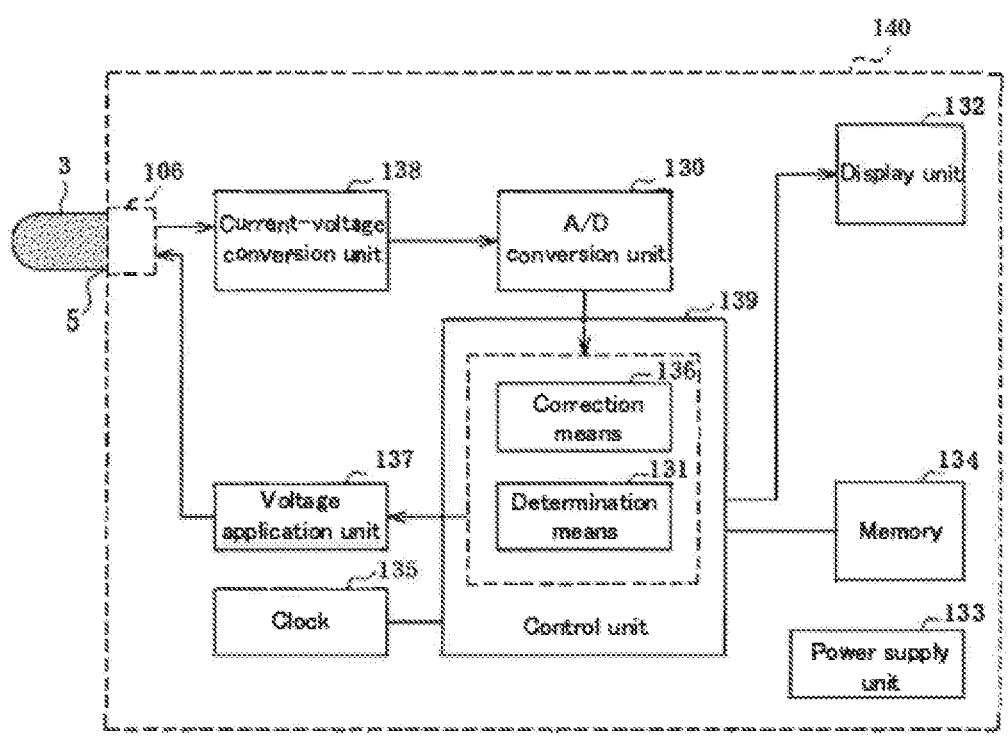
FIG. 27 is an electrical block diagram of a blood component measuring device with the biosensor used in the measurement method of the present invention being inserted thereinto.

FIG. 27 shows an example of an electrical block diagram 140 of the measuring device with the biosensor used in the measurement method of the present invention being inserted thereinto. In the measuring device of the present invention, a voltage application unit 137 for applying a voltage and a current-voltage conversion unit 138 are connected to an input terminal portion 106 of the measuring device according to an embodiment of the present invention. A voltage is applied to the voltage application unit 137 from a control unit 139, and this voltage is applied to desired electrodes selected from electrodes of respective electrode systems and a blood component introduction detection electrode of the biosensor 3 for a predetermined period of time through the input terminal portion 106. The current that flows between the electrodes in the biosensor 3 due to this voltage application is converted into a voltage by the current-voltage conversion unit 138. Thereafter, the voltage is subjected to digital conversion by an A/D conversion unit 130, and this digitized voltage is compared with a threshold value by a determination means 131.

A display unit 132 connected to the control unit 139 is configured to display the amount of a blood component detected by the biosensor 3 and the result of determination made by the determination means 131. In FIG. 27, reference numeral 133 denotes a power supply unit for supplying electric power to the above-described respective units. Reference numeral 134 denotes a memory that is provided with a table including applied voltages, application times, etc. used when measuring the hematocrit and the blood component and a calibration curve and calibration table that are prepared beforehand based on environmental temperatures.

A clock 135 is connected to the control unit 139, and the control unit 139 is configured to execute various control operations utilizing the time indicated and the time measured by the clock 135. Furthermore, a correction means 136 is provided in the control unit 139. The correction means 136 corrects the measured amount of the blood component using the hematocrit, thereby improving the measurement accuracy of the amount of the blood component.

Next, examples of the method for measuring the amount of a blood component according to the present invention will be described with reference to the drawings.

Embodiment 1

Embodiment 1 is an example of the blood component amount measurement method 1 of the present invention.

Figure 3:
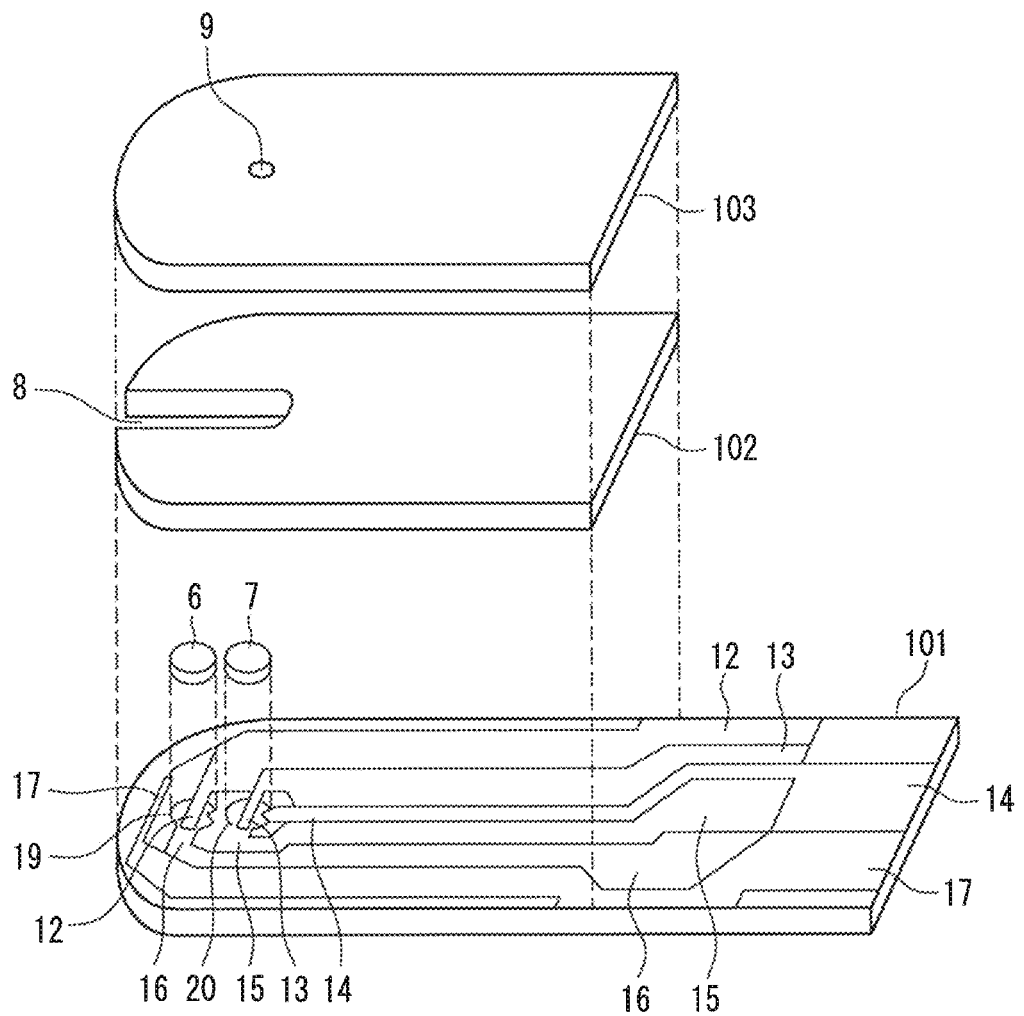
FIG. 3 is an exploded perspective view showing an example of a biosensor used in the measurement method of the present invention.
Figure 4:
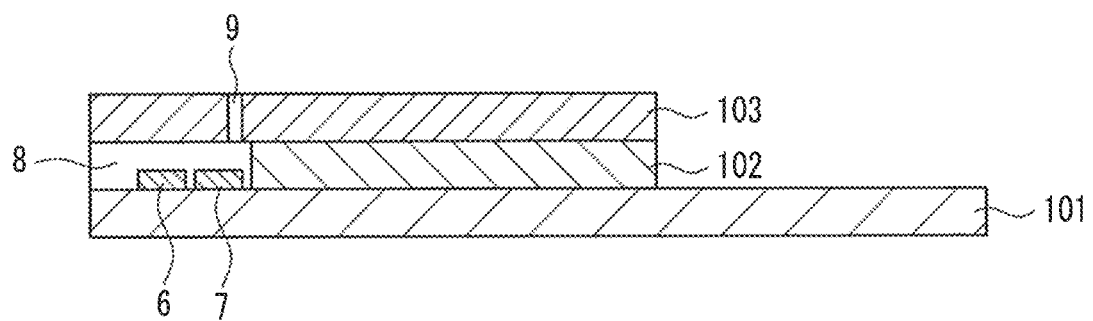
FIG. 4 is a cross-sectional view of the biosensor shown in FIG. 3.
Figure 5:
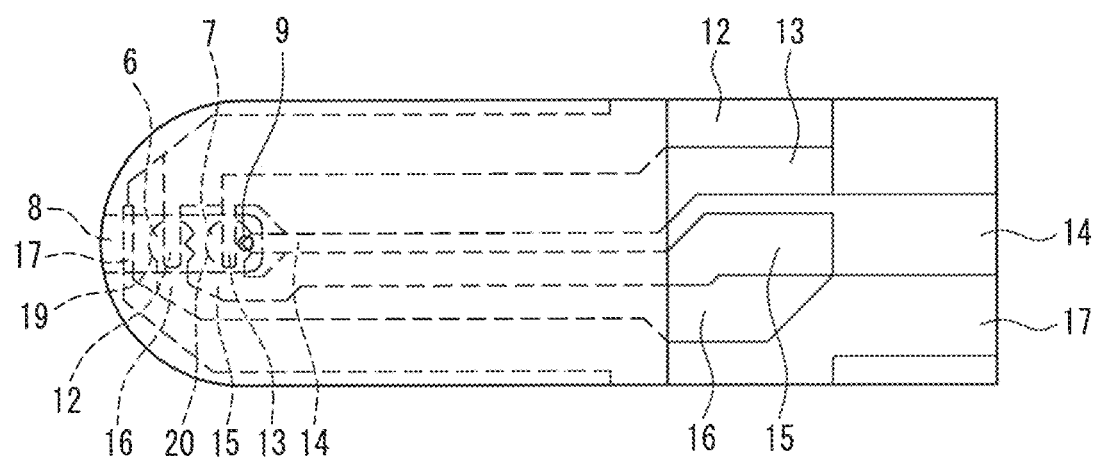
FIG. 5 is a plan view of the biosensor shown in FIG. 3.

FIGS. 3, 4, and 5 show an example of a biosensor used in the measurement method of the present invention. FIG. 3 is an exploded perspective view of the sensor, FIG. 4 is a cross-sectional view of the sensor, and FIG. 5 is a plan view of the sensor. In the above-described three drawings, the same components and portions are given the same reference numerals. As an illustrative example, this biosensor is a sensor for measuring glucose as a blood component.

As shown in the drawings, in this sensor, six electrodes 12, 13, 14, 15, 16, and 17 are formed on an insulating substrate 101. These electrodes are each switchable between a working electrode and a counter electrode. The surface of the electrode 17 is coated with a polymer material such as CMC. A first reagent layer 6 is disposed so as to cover portions of the electrodes 12 and 16, and a second reagent layer 7 is disposed so as to cover portions of the electrodes 13, 14, and 15. The first reagent layer 6 and the second reagent layer 7 are disposed spaced apart from each other. The second reagent layer 7 contains a reagent for measuring the amount of a blood component in blood, preferably an oxidoreductase (e.g., glucose dehydrogenase), and more preferably an oxidoreductase and a mediator (e.g., potassium ferricyanide), and optionally contains an enzyme stabilizer, a crystal homogenizing agent, and/or the like. The first reagent layer preferably contains a mediator, and optionally contains an enzyme stabilizer, a crystal homogenizing agent, and the like.

A cover 103 is disposed on the insulating substrate 101 via a spacer 102 with one end of the insulating substrate 101 (the right end in the drawings) being left uncovered. In this sensor, in order to introduce blood to the respective electrodes (12, 13, 14, 15, 16, and 17), a channel 8 is formed by the insulating substrate 101, the spacer 102, and the cover 103. The leading end of this channel 8 extends to the other end of the biosensor (the left end in the drawings) and is open to the outside to serve as a blood supply port 10. The six electrodes (12, 13, 14, 15, 16, and 17) are connected to leads, respectively; and these leads extend toward the above-described one end (the right end in the drawings), and leading ends of the leads are exposed without being covered by the cover. The cover 103 has an air hole 9 formed in a portion (on the second reagent layer 7 or on the electrode 14) corresponding to the right end of the channel 8. Further, the electrode 17, the first reagent layer 6, and the second reagent layer 7 are disposed spaced apart from each other in the channel 8.

In the present invention, the material of the insulating substrate is not particularly limited. Examples of the material that can be used include polyethylene terephthalate (PET), polycarbonate (PC), polyimide (PI), polyethylene (PE), polypropylene (PP), polystyrene (PS), polyvinyl chloride (PVC), polyoxymethylene (POM), monomer-cast nylon (MC), polybutylene terephthalate (PBT), methacrylic resins (PMMA), ABS resin (ABS), and glass. Of these, polyethylene terephthalate (PET), polycarbonate (PC), and polyimide (PI) are preferable, and polyethylene terephthalate (PET) is more preferable. The size of the insulating substrate is not particularly limited, and the insulating substrate has, for example, an overall length of 5 to 100 mm, a width of 2 to 50 mm, and a thickness of 0.05 to 2 mm, preferably an overall length of 7 to 50 mm, a width of 3 to 20 mm, and a thickness of 0.1 to 1 mm, and more preferably an overall length of 10 to 30 mm, a width of 3 to 10 mm, and a thickness of 0.1 to 0.6 mm. The same applies to the material and the size of an insulating substrate in embodiments to be described below The electrodes and the leads on the insulating substrate can be formed by, for example, forming a conductive layer through sputtering or vapor deposition using a material such as gold, platinum, or palladium, and working the conductive layer into a specific electrode pattern using a laser. As the laser, a YAG laser, a $CO_2$ laser, an excimer laser, or the like can be used, for example. This also applies to the embodiments to be described below.

The second reagent layer 7 is formed in the following manner. For example, an aqueous solution containing 0.1 to 5 U/sensor of an oxidoreductase (e.g., glucose dehydrogenase), 10 to 200 mM of a mediator (e.g., potassium ferricyanide), 1 to 50 mM of an enzyme stabilizer (e.g., maltitol), and 20 to 200 mM of a crystal homogenizing agent (e.g., taurine) is applied dropwise to a circular slit portion 20 and is then dried. The presence of this slit portion 20 can suppress the spread of the aqueous solution applied dropwise, and this allows more accurate positioning of the reagent layer 7. Thus, the reagent layer 7 is formed so as to cover portions of the electrodes 13, 14, and 15. The drying may be, for example, natural drying or forced drying using warm air.

The first reagent layer 6 is formed in the following manner. For example, an aqueous solution containing 10 to 200 mM of a mediator (e.g., potassium ferricyanide) and 20 to 200 mM of a crystal homogenizing agent (e.g., taurine) is applied dropwise to a circular slit portion 19 and is then dried. The presence of this slit portion 19 can suppress the spread of the aqueous solution applied dropwise, and this allows more accurate positioning of the reagent layer 7. Thus, the reagent layer 6 is formed so as to cover portions of the electrodes 12 and 16. The drying may be, for example, natural drying or forced drying using warm air.

In the present invention, the material of the spacer 102 is not particularly limited, and examples thereof include those given above as examples of the material of the insulating substrate. Furthermore, the size of the spacer is not particularly limited, and the spacer has, for example, an overall length of 5 to 100 mm, a width of 2 to 50 mm, and a thickness of 0.01 to 1 mm, preferably an overall length of 7 to 50 mm, a width of 3 to 20 mm, and a thickness of 0.05 to 0.5 mm, and more preferably an overall length of 10 to 30 mm, a width of 3 to 10 mm, and a thickness of 0.05 to 0.25 mm. The spacer of this example has an I-shaped cutout portion that forms the channel for blood introduction. The I-shaped cutout portion has, for example, an overall length of 0.5 to 8 mm and a width of 0.1 to 5 mm, preferably an overall length of 1 to 10 mm and a width of 0.2 to 3 mm, and more preferably an overall length of 1 to 5 mm and a width of 0.5 to 2 mm. This cutout portion may be formed through, for example, cutting with a laser, a drill, or the like, or forming the spacer using a mold with which the cutout portion can be formed. The same applies to the material and the size of a spacer and to a cutout portion in the embodiment to be described below.

In the present invention, the material of the cover 103 is not particularly limited. Examples of the material of the cover 103 include those given above as examples of the material of the insulating substrate. It is more preferable that a portion of the cover that forms the ceiling of the channel for blood introduction is subjected to hydrophilic treatment. The hydrophilic treatment may be performed using a method such as, for example, applying a surfactant or introducing a hydrophilic functional group such as a hydroxyl group, a carbonyl group, or a carboxyl group to the surface of the cover through plasma treatment or the like. Furthermore, a layer composed of a surfactant such as lecithin may be formed on the reagent layers. The size of the cover is not particularly limited. The cover has, for example, an overall length of 5 to 100 mm, a width of 3 to 50 mm, and a thickness of 0.01 to 0.5 mm, preferably an overall length of 10 to 50 mm, a width of 3 to 20 mm, and a thickness of 0.05 to 0.25 mm, and more preferably an overall length of 15 to 30 mm, a width of 5 to 10 mm, and a thickness of 0.05 to 0.1 mm. The cover preferably has the air hole 9 formed therein, and the shape of the air hole 9 is, for example, circular, oval, polygonal, or the like. The air hole 9 has, for example, a maximum diameter of 0.01 to 10 mm, preferably a maximum diameter of 0.05 to 5 mm, and more preferably a maximum diameter of 0.1 to 2 mm. The air hole may be formed by, for example, perforating the cover using a laser, a drill, or the like, or forming the cover using a mold with which an air vent portion can be formed. The same applies to the material and the size of a cover and to an air hole in the embodiments to be described below.

Moreover, this biosensor can be produced by stacking the insulating substrate 101, the spacer 102, and the cover 103 in this order and integrating them. The above-described three members are integrated by attaching them together using an adhesive or through thermal fusion binding or the like. Examples of the adhesive that can be used include epoxy adhesives, acrylic adhesives, polyurethane adhesives, thermosetting adhesives (hot melt adhesives and the like), and UV curable adhesives. This also applies to the embodiments to be described below.

Measurement of the amount of a blood component, e.g., measurement of the blood glucose level using this sensor is carried out in the following manner. First, a fingertip or the like is pricked with a dedicated lancet to cause bleeding. Meanwhile, the biosensor is set in a dedicated measuring device (meter). The blood supply port of the sensor set in the measuring device is brought into contact with the blood at the bleeding site, and the blood is introduced into the sensor through capillary action. The analysis using this sensor is carried out as per the following steps.

In Embodiment 1, the electrode 12 is used as an electrode A, the electrode 13 is used as an electrode C, the electrode 14 is used as an electrode D, the electrode 15 is used as an electrode E, the electrode 16 is used as an electrode G, and the electrode 17 is used as an electrode F. FIG. 8 shows which of the electrodes is used as the counter electrode and the working electrode of each of the first electrode system, the second electrode system, and the third electrode system.

(Step A: Detection of Sample (Blood))

A voltage is applied between the electrode D and the electrode E, and the introduction of blood is detected based on a change in the current value accompanying the introduction of blood. After the introduction of the blood is detected, subsequent steps are started. The voltage applied in Step A is, for example, 0.05 to 1 V, and preferably 0.7 V. Then, glucose in the blood is allowed to react with glucose oxidoreductase for a certain period of time. It should be noted that Step A is optional (Step B: Step of Measuring Blood Component Amount-Dependent Current Values)

Figure 6:
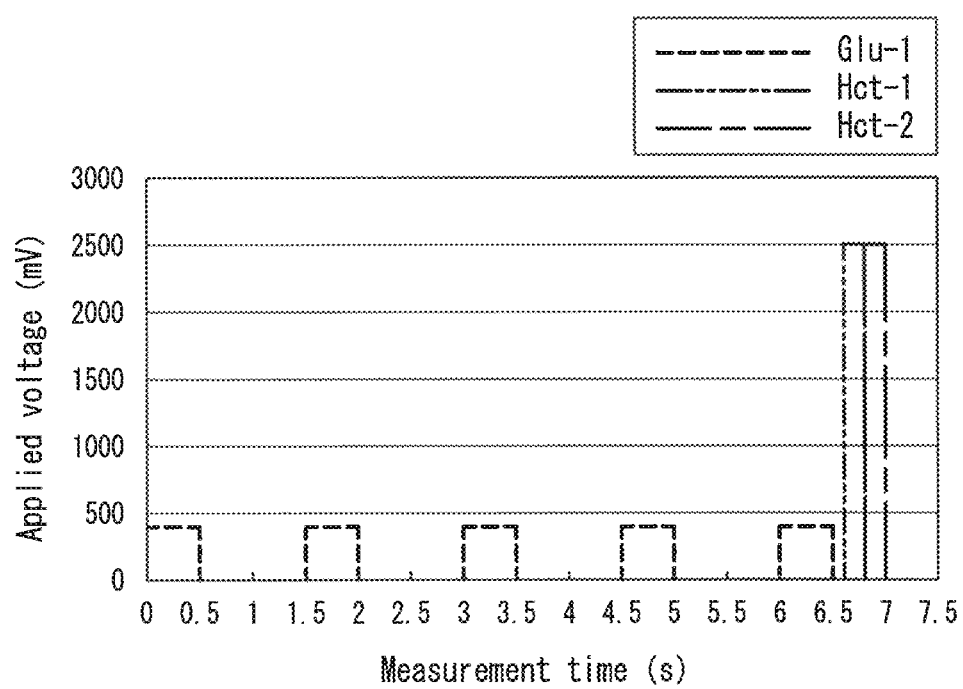
FIG. 6 is a diagram showing change in voltage value over time in a voltage application pattern in Embodiment 1.

As shown in FIG. 6, after the glucose in the blood has been reacted with the glucose oxidoreductase for a certain period of time, the measuring device 2 applies a voltage to the third electrode system while controlling the voltage value and the application time of a third voltage. The measuring device 2 starts to measure the current when a detection electrode system (the electrode D and the electrode E) detects the blood to be measured after the blood has been introduced into the biosensor 3.

At this time, the measuring device 2 changes the electrodes to be subjected to voltage application, the applied voltage, the application time, and the timing of voltage application as shown in FIG. 7. The third voltage is applied between the electrodes in the third electrode system (including the electrode C serving as the working electrode and the electrodes D and E serving as the counter electrodes). In FIG. 6, voltage application indicated with "Glu-1" corresponds to the voltage application in this step. The third voltage is 400 mV. The third step of applying the third voltage to the third electrode system and detecting a blood component amount-dependent current value is performed a plurality of times, e.g., five times.

Third blood component amount-dependent current values obtained by applying the third voltage to the third electrode system are used in a step of calculating the amount of the blood component to be described below.

(Step C: Step of Measuring Hct)

As shown in FIG. 6, after the step of measuring the blood component amount-dependent current values, the measuring device 2 applies a voltage to the second electrode system while controlling the voltage value and the application time of a second voltage and applies a voltage to the first electrode system while controlling the voltage value and the application time of a first voltage. Although Step B is performed first and then Step C is performed in this example, some of the processes in Step C may be performed first and then Step B may be performed.

At this time, the measuring device 2 changes the electrodes to be subjected to voltage application, the applied voltage, the application time, and the timing of voltage application as shown in FIG. 7. The second voltage is applied between the electrodes in the second electrode system (including the electrode F serving as the working electrode and the electrodes A and G serving as the counter electrodes). In FIG. 6, voltage application indicated with "Hct-1" corresponds to the voltage application in this step. The second voltage is 2500 mV. The first voltage is applied between the electrodes in the first electrode system (including the electrode F serving as the working electrode and the electrodes C, E, and D serving as the counter electrodes). As described above, at least one of the third working electrode (the electrode C) and the third counter electrodes (the electrode E, the electrode D) of the third electrode system is used as the first counter electrode (the electrode C, the electrode E, and the electrode D) of the first electrode system. A second hematocrit-dependent current value obtained by applying the second voltage to the second electrode system and a first hematocrit-dependent current value obtained by applying the first voltage to the first electrode system are used in the step of calculating the amount of the blood component to be described below.

The first voltage is applied between the electrodes in the first electrode system (including the electrode F serving as the working electrode and the electrodes C, E, and D serving as the counter electrodes). In FIG. 6, voltage application indicated with "Hct-2" corresponds to the voltage application in this step. The second voltage is 2500 mV. The electrode F is coated with a polymer such as CMC only, and the first reagent layer and the second reagent layer are not disposed on the electrode F. That is, the electrode F can be considered a bare electrode.

(Step D: Step of Calculating Amount of Blood Component)

The plurality of, e.g., five blood component amount-dependent current values obtained are processed as follows before they are used as the blood component amount-dependent current values.

A plurality of parameters ($x1$, $x2$, $x3$, . . . , $x10$) are calculated based on, for example, the extracted current values measured at the plurality of predetermined time points and the extracted temperature information of the biological information measuring device ("calculate predetermined parameters"), a correction amount is calculated using a multiple regression equation (e.g., Formula 1 below), and then a blood component amount-dependent current value is calculated.

$$y = ax1 + bx2 + cx3 \ldots + kx10 + l \quad \text{(Formula 1)}$$

(y denotes the correction amount, x1, x2, x3 . . . , and x10 denote parameters, and a, b, c, . . . and l denote coefficients)

The amount of the blood component is obtained using the Hct-dependent current values (the first and second Hct-dependent current values) obtained in Step C and the blood component amount-dependent current values (the third blood component amount-dependent current values) obtained in Step B. Preferably, this is performed based on a calibration curve (including a calibration table) prepared beforehand. The thus-obtained amount of the blood component is displayed or stored in the measuring device. The amount of the blood component may be obtained using the amount of Hct calculated from the Hct-dependent current values obtained in Step C and the blood component amount-dependent current values obtained in Step B.

After the amount of the blood component has been calculated, the biosensor is discarded and the display unit and the like are turned off. Thereafter, the measuring device is also turned off to complete the measurement of the component of the biological sample.

According to Embodiment 1, in the first step and the second step for measuring Hct, the first reagent layer and the second reagent layer, which are disposed only on the counter electrodes used in the respective steps, are disposed spaced apart from each other, and thus Hct can be measured more accurately. When the first reagent layer and the second reagent layer are disposed spaced apart from each other as described above, the distribution of blood in the capillary can be known in detail.

Embodiment 2A

Embodiment 2A is an example of the blood component amount measurement methods 2I and 2A of the present invention.

Figure 9:
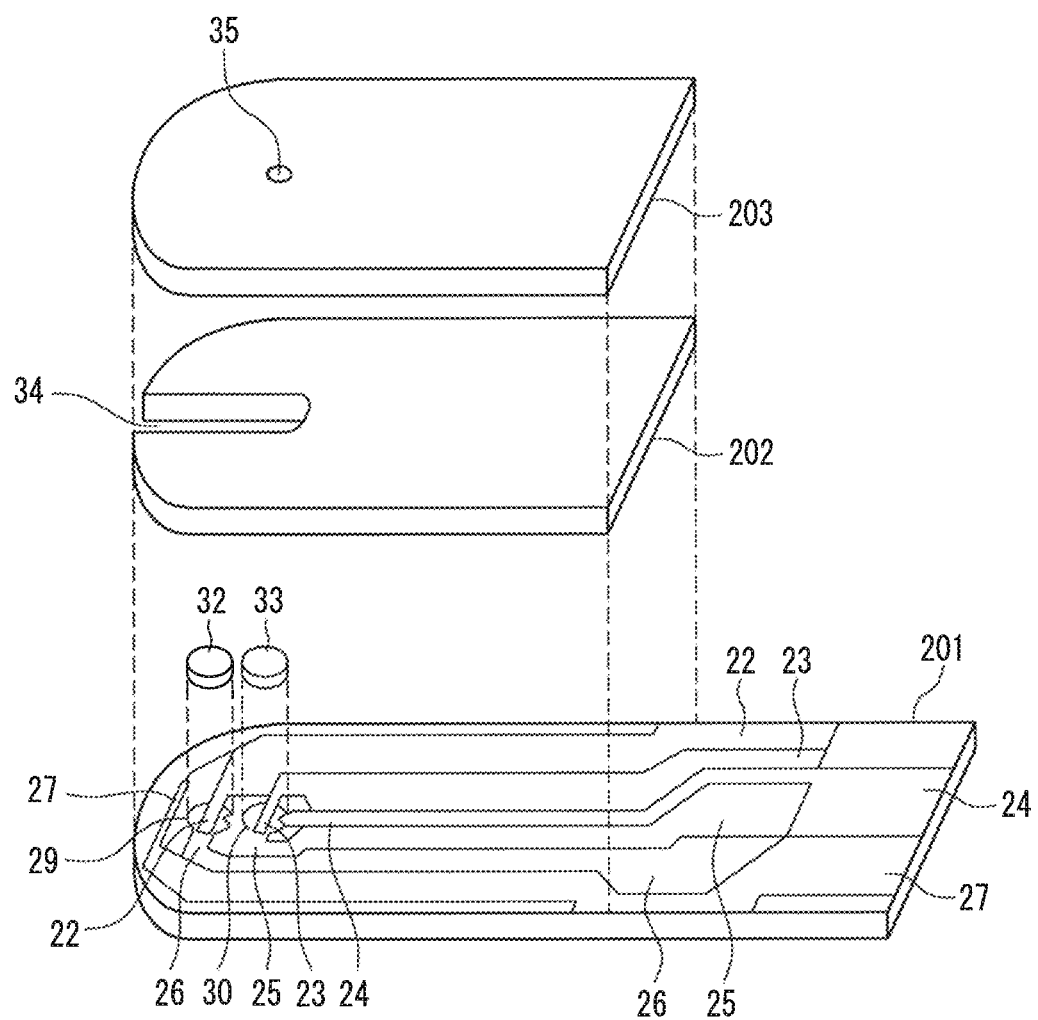
FIG. 9 is an exploded perspective view showing another example of the biosensor used in the measurement method of the present invention.
Figure 10:
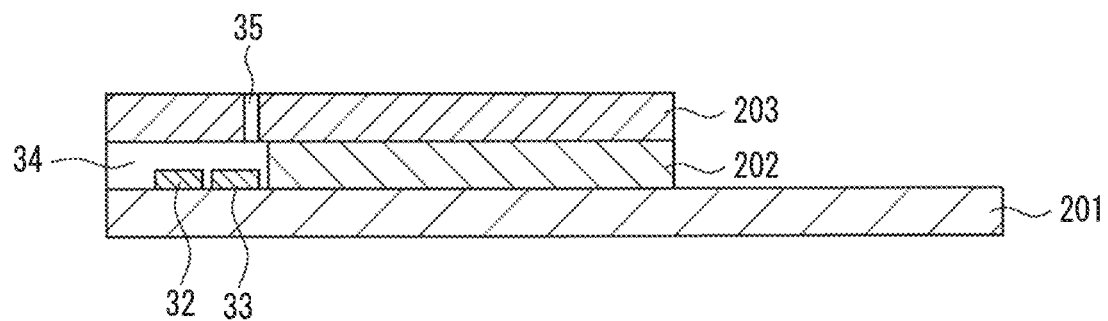
FIG. 10 is a cross-sectional view of the biosensor shown in FIG. 9.
Figure 11:
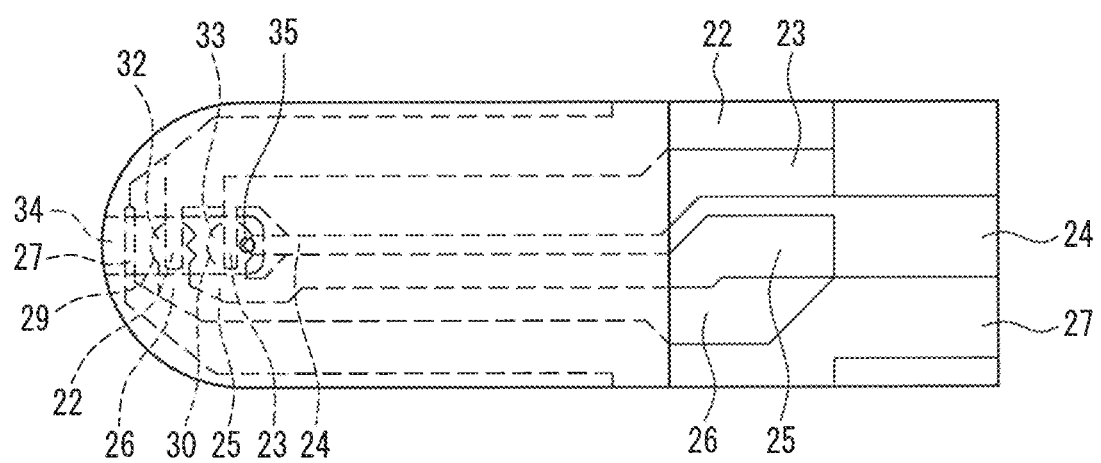
FIG. 11 is a plan view of the biosensor shown in FIG. 9.

FIGS. 9, 10, and 11 show another example of the biosensor used in the measurement method of the present invention. FIG. 9 is an exploded perspective view of the sensor, FIG. 10 is a cross-sectional view of the sensor, and FIG. 11 is a plan view of the sensor. In the above-described three drawings, the same components and portions are given the same reference numerals. As an illustrative example, this biosensor is a sensor for measuring glucose as a blood component.

As shown in the drawings, in this sensor, six electrodes 22, 23, 24, 25, 26, and 27 are formed on an insulating substrate 201. These electrodes are each switchable between a working electrode and a counter electrode. The surfaces of the electrodes 22, 23, 24, 25, 26, and 27 are coated with a polymer material such as CMC. A third reagent layer 32 is disposed so as to cover portions of the electrodes 22 and 26, and a second reagent layer 33 is disposed so as to cover portions of the electrodes 23, 24, and 25. The third reagent layer 32 and the second reagent layer 33 are disposed spaced apart from each other. The second reagent layer contains a reagent for measuring the amount of a blood component in blood, preferably an oxidoreductase (e.g., glucose dehydrogenase), and more preferably an oxidoreductase and a mediator (e.g., potassium ferricyanide), and optionally contains an enzyme stabilizer, a crystal homogenizing agent, and the like. The third reagent layer contains a reagent for measuring the amount of a blood component in blood, preferably an oxidoreductase (e.g., glucose dehydrogenase), and more preferably an oxidoreductase and a mediator (e.g., potassium ferricyanide), and optionally contains an enzyme stabilizer, a crystal homogenizing agent, and the like.

A cover 203 is disposed on the insulating substrate 201 via a spacer 202 with one end of the insulating substrate 201 (the right end in the drawings) being left uncovered. In this sensor, in order to introduce blood to the respective electrodes (22, 23, 24, 25, 26, and 27), a channel 34 is formed by the insulating substrate 201, the spacer 202, and the cover 203. The leading end of this channel 34 extends to the other end of the biosensor (the left end in the drawings) and is open to the outside to serve as a blood supply port 10. The six electrodes (22, 23, 24, 25, 26, and 27) are connected to leads, respectively and these leads extend toward the above-described one end (the right end in the drawings), and leading ends of the leads are exposed without being covered with the cover. The cover 203 has an air hole 35 formed in a portion (on the second reagent layer 33 or on the electrode 24) corresponding to the right end of the channel 34. Further, the electrode 27, the third reagent layer 32, and the second reagent layer 33 are disposed spaced apart from each other in the channel 34.

In the present invention, the material of the insulating substrate is not particularly limited. Examples of the material that can be used include polyethylene terephthalate (PET), polycarbonate (PC), polyimide (PI), polyethylene (PE), polypropylene (PP), polystyrene (PS), polyvinyl chloride (PVC), polyoxymethylene (POM), monomer-cast nylon (MC), polybutylene terephthalate (PBT), methacrylic resins (PMMA), ABS resin (ABS), and glass. Of these, polyethylene terephthalate (PET), polycarbonate (PC), and polyimide (PI) are preferable, with polyethylene terephthalate (PET) being more preferable. The size of the insulating substrate is not particularly limited, and the insulating substrate has, for example, an overall length of 5 to 100 mm, a width of 2 to 50 mm, and a thickness of 0.05 to 2 mm, preferably an overall length of 7 to 50 mm, a width of 3 to 20 mm, and a thickness of 0.1 to 1 mm, and more preferably an overall length of 10 to 30 mm, a width of 3 to 10 mm, and a thickness of 0.1 to 0.6 mm. The same applies to the material and the size of an insulating substrate in embodiments to be described below.

The electrodes and the leads on the insulating substrate can be formed by, for example, forming a conductive layer through sputtering or vapor deposition using a material such as gold, platinum, or palladium, and working the conductive layer into a specific electrode pattern using a laser. As the laser, a YAG laser, a $CO_2$ laser, an excimer laser, or the like can be used, for example. This also applies to the embodiments to be described below.

The second reagent layer 33 is formed in the following manner. For example, an aqueous solution containing 0.1 to 5 U/sensor of an oxidoreductase (e.g., glucose dehydrogenase), 10 to 200 mM of a mediator (e.g., potassium ferricyanide), 1 to 50 mM of an enzyme stabilizer (e.g., maltitol), and 20 to 200 mM of a crystal homogenizing agent (e.g., taurine) is applied dropwise to a circular slit portion (not shown) and is then dried. The presence of this slit portion can suppress the spread of the aqueous solution applied dropwise, and this allows more accurate positioning of the reagent layer 33. Thus, the reagent layer 33 is formed so as to cover portions of the electrodes 23, 24, and 25. The drying may be, for example, natural drying or forced drying using warm air.

The third reagent layer 32 is also formed in the following manner. For example, an aqueous solution containing 0.1 to 5 U/sensor of an oxidoreductase (e.g., glucose dehydrogenase), 10 to 200 mM of a mediator (e.g., potassium ferricyanide), 1 to 50 mM of an enzyme stabilizer (e.g., maltitol), and 20 to 200 mM of a crystal homogenizing agent (e.g., taurine) is applied dropwise to a circular slit portion (not shown) and is then dried. The presence of this slit portion can suppress the spread of the aqueous solution applied dropwise, and this allows more accurate positioning of the reagent layer 32. Thus, the reagent layer 32 is formed so as to cover portions of the electrodes 22 and 26. The drying may be, for example, natural drying or forced drying using warm air.

In the present invention, the material of the spacer 202 is not particularly limited, and examples thereof include those given above as examples of the material of the insulating substrate. Furthermore, the size of the spacer is not particularly limited, and the spacer has, for example, an overall length of 5 to 100 mm, a width of 2 to 50 mm, and a thickness of 0.01 to 1 mm, preferably an overall length of 7 to 50 mm, a width of 3 to 20 mm, and a thickness of 0.05 to 0.5 mm, and more preferably an overall length of 10 to 30 mm, a width of 3 to 10 mm, and a thickness of 0.05 to 0.25 mm. The spacer of this example has an I-shaped cutout portion that forms the channel for blood introduction. The I-shaped cutout portion has, for example, an overall length of 0.5 to 8 mm and a width of 0.1 to 5 mm, preferably an overall length of 1 to 10 mm and a width of 0.2 to 3 mm, and more preferably an overall length of 1 to 5 mm and a width of 0.5 to 2 mm. This cutout portion may be formed through, for example, cutting with a laser, a drill, or the like, or forming the spacer using a mold with which the cutout portion can be formed. The same applies to the material and the size of a spacer and to a cutout portion in the embodiment to be described below.

In the present invention, the material of the cover 203 is not particularly limited. Examples of the material of the cover 103 include those given above as examples of the material of the insulating substrate. It is more preferable that a portion of the cover that forms the ceiling of the channel for blood introduction is subjected to hydrophilic treatment. The hydrophilic treatment may be performed using a method such as, for example, applying a surfactant or introducing a hydrophilic functional group such as a hydroxyl group, a carbonyl group, or a carboxyl group to the surface of the cover through plasma treatment or the like. Furthermore, a layer composed of a surfactant such as lecithin may be formed on the reagent layers. The size of the cover is not particularly limited. The cover has, for example, an overall length of 5 to 100 mm, a width of 3 to 50 mm, and a thickness of 0.01 to 0.5 mm, preferably an overall length of 10 to 50 mm, a width of 3 to 20 mm, and a thickness of 0.05 to 0.25 mm, and more preferably an overall length of 15 to 30 mm, a width of 5 to 10 mm, and a thickness of 0.05 to 0.1 mm. The cover preferably has the air hole 9 formed therein, and the shape of the air hole 9 is, for example, circular, oval, polygonal, or the like. The air hole 9 has, for example, a maximum diameter of 0.01 to 10 mm, preferably a maximum diameter of 0.05 to 5 mm, and more preferably a maximum diameter of 0.1 to 2 mm. The air hole may be formed by, for example, perforating the cover using a laser, a drill, or the like, or forming the cover using a mold with which an air vent portion can be formed. The same applies to the material and the size of a cover and to an air hole in the embodiments to be described below.

Moreover, this biosensor can be produced by stacking the insulating substrate 201, the spacer 202, and the cover 203 in this order and integrating them. The above-described three members are integrated by attaching them together using an adhesive or through thermal fusion binding or the like. Examples of the adhesive that can be used include epoxy adhesives, acrylic adhesives, polyurethane adhesives, thermosetting adhesives (hot melt adhesives and the like), and UV curable adhesives. This also applies to the embodiments to be described below.

Measurement of the amount of a blood component, e.g., measurement of the blood glucose level using this sensor is carried out in the following manner. First, a fingertip or the like is pricked with a dedicated lancet to cause bleeding. Meanwhile, the biosensor is set in a dedicated measuring device (meter). The blood supply port of the sensor set in the measuring device is brought into contact with the blood at the bleeding site, and the blood is introduced into the sensor through capillary action. The analysis using this sensor is carried out as per the following steps.

In Embodiment 2A, the electrode 22 is used as an electrode A, the electrode 23 is used as an electrode C, the electrode 24 is used as an electrode D, the electrode 25 is used as an electrode E, the electrode 26 is used as an electrode G, and the electrode 27 is used as an electrode F. FIG. 14 shows which of the electrodes is used as the counter electrode and the working electrode of each of the first electrode system, the second electrode system, the third electrode system, and the third electrode system.

(Step A: Detection of Sample (Blood))

A voltage is applied between the electrode D and the electrode E, and the introduction of blood is detected based on a change in the current value accompanying the introduction of blood. After the introduction of the blood is detected, subsequent steps are started. The voltage applied in Step A is, for example, 0.05 to 1 V, and preferably 0.7 V. Then, glucose in the blood is allowed to react with glucose oxidoreductase for a certain period of time. It should be noted that Step A is optional.

(Step B: Step of Measuring Blood Component Amount-Dependent Current Values)

Figure 12:
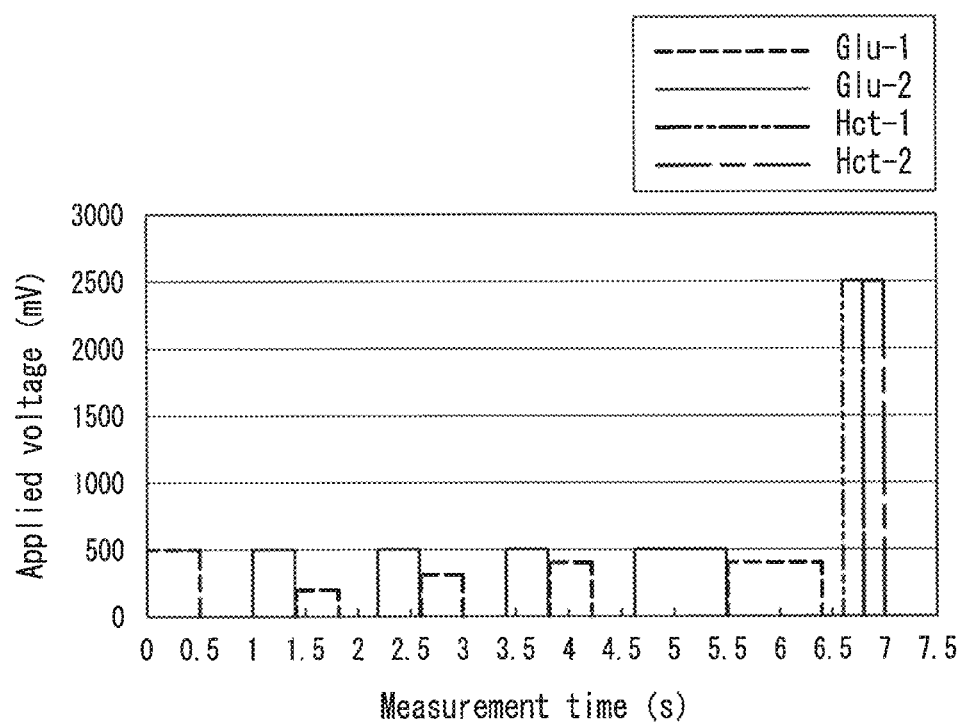
FIG. 12 is a diagram showing change in voltage value over time in a voltage application pattern in Embodiment 2A.

As shown in FIG. 12, after the glucose in the blood has been reacted with the glucose oxidoreductase for a certain period of time, the measuring device 2 applies a voltage to the third electrode system while controlling the voltage value and the application time of a third voltage (third step). The measuring device 2 starts to measure the current when a detection electrode system (the electrode D and the electrode E) detects the blood to be measured after the blood has been introduced into the biosensor 3.

At this time, the measuring device 2 changes the electrodes to be subjected to voltage application, the applied voltage, the application time, and the timing of voltage application as shown in FIG. 13. The third voltage is applied between the electrodes in the third electrode system (including the electrode C serving as the working electrode and the electrodes D and E serving as the counter electrodes). In FIG. 12, voltage application indicated with "Glu-1" corresponds to the voltage application in this third step. The third step of applying the third voltage to the third electrode system and detecting a blood component amount-dependent current value is performed a plurality of times, e.g., five times.

In the case where the third step is performed at least twice, the third voltages may be different from each other. This is because the effects of interfering substances that react at different voltages can be observed.

In this Step B, after the third step, a voltage is applied to the fourth electrode system while controlling the voltage value and the application time of a fourth voltage (fourth step). In FIG. 12, voltage application indicated with "Glu-2" corresponds to the voltage application in this fourth step. The fourth voltage is 500 mV. The fourth step of applying the fourth voltage to the fourth electrode system and detecting a blood component amount-dependent current value is performed a plurality of times, e.g., five times. The third steps and the fourth steps are performed in turn as follows, for example: the third step, the fourth step, the third step, the fourth step, and so on. In the case where the fourth step is performed at least twice, the fourth voltages may be equal to each other. This is because, for example, transition of the response value (current value) on the time axis can be observed.

In this Step B, the third step may be performed at least twice, the fourth step may be performed at least twice, and the third steps and the fourth steps may be performed alternately.

In Step B, the order of performing the third step and the fourth step may be changed. That is, although the third step is performed first in the example illustrated in FIG. 12, the fourth step may be performed first.

Third hematocrit-dependent current values obtained by applying the third voltage to the third electrode system and fourth blood component amount-dependent current values obtained by applying the fourth voltage to the fourth electrode system are used in a step of calculating the amount of the blood component to be described below.

(Step C: Step of Measuring Hct)

As shown in FIG. 12, after performing the steps of measuring the blood component amount-dependent current values (the third step and the fourth step), the measuring device 2 applies a voltage to the second electrode system while controlling the voltage value and the application time of a second voltage (second step) and applies a voltage to the first electrode system while controlling the voltage value and the application time of a first voltage (first step). Although Step B is performed first and then Step C is performed in this example, Step C may be performed first and then Step B may be performed.

At this time, the measuring device 2 changes the electrodes to be subjected to voltage application, the applied voltage, the application time, and the timing of voltage application as shown in FIG. 13. The second voltage is applied between the electrodes in the second electrode system (including the electrode F serving as the working electrode and the electrodes A and G serving as the counter electrodes). In FIG. 12, voltage application indicated with "Hct-1" corresponds to the voltage application in this step. The second voltage is 2500 mV. The first voltage is applied between the electrodes in the first electrode system (including the electrode F serving as the working electrode and the electrodes C, E, and D serving as the counter electrodes). As described above, at least one of the third working electrode (the electrode C) and the third counter electrodes (the electrode E, the electrode D) of the third electrode system is used as the first counter electrode (the electrode C, the electrode E, and the electrode D) of the first electrode system. A second hematocrit-dependent current value obtained by applying the second voltage to the second electrode system and a first hematocrit-dependent current value obtained by applying the first voltage to the first electrode system are used in the step of calculating the amount of the blood component to be described below.

The first voltage is applied between the electrodes in the first electrode system (including the electrode F serving as the working electrode and the electrodes C, E, and D serving as the counter electrodes). In FIG. 12, the voltage application indicated with "Hct-2" corresponds to the voltage application in this step. The second voltage is 2500 mV. The electrode F is coated with a polymer such as CMC only, and the second reagent layer and the third reagent layer are not disposed on the electrode F. That is, the electrode F can be considered a bare electrode.

(Step D: Step of Calculating Amount of Blood Component)

The plurality of, e.g., the plurality of blood component amount-dependent current values obtained are processed as follows before they are used as the blood component amount-dependent current values.

A plurality of parameters (x1, x2, x3, . . . , x10) are calculated based on, for example, the extracted current values measured at the plurality of predetermined time points and the extracted temperature information of the biological information measuring device ("calculate predetermined parameters"), a correction amount is calculated using a multiple regression equation (e.g., Formula 1 below), and then a blood component amount-dependent current value is calculated.

$$y = ax1 + bx2 + cx3 \ldots + kx10 + l \qquad \text{(Formula 1)}$$

(y denotes the correction amount, x1, x2, x3 . . . , and x10 denote parameters, and a, b, c, . . . and l denote coefficients.)

The amount of the blood component is obtained using the Hct-dependent current values (the first and second Hct-dependent current values) obtained in Step C and the blood component amount-dependent current values (the third and fourth blood component amount-dependent current values) obtained in Step B. Preferably, this is performed based on a calibration curve (including a calibration table) prepared beforehand. The thus-obtained amount of the blood component is displayed or stored in the measuring device. The amount of the blood component may be obtained using the amount of Hct calculated from the Hct-dependent current values obtained in Step C and the blood component amount-dependent current values obtained in Step B.

After the amount of the blood component has been calculated, the biosensor is discarded and the display unit and the like are turned off. Thereafter, the measuring device is also turned off to complete the measurement of the component of the biological sample.

According to this Embodiment 2A, by applying different voltages to the third and fourth electrode systems for measuring a blood component, the effects of interfering substances that react at different voltages can be reflected in the amount of the blood component to be finally obtained.

Embodiment 2B

Embodiment 2B is an example of the blood component amount measurement method 2B of the present invention.

The biosensor used in this method is the same as the biosensor used in Embodiment 2A. In Embodiment 2B, the electrode 12 is used as the electrode A, the electrode 13 is used as the electrode C, the electrode 14 is used as the electrode D, the electrode 15 is used as the electrode E, the electrode 16 is used as the electrode G, and the electrode 17 is used as the electrode F. FIG. 17 shows which of the electrodes is used as the counter electrode and the working electrode of each of the first electrode system, the second electrode system, the third electrode system, and the fourth electrode system.

Figure 15:
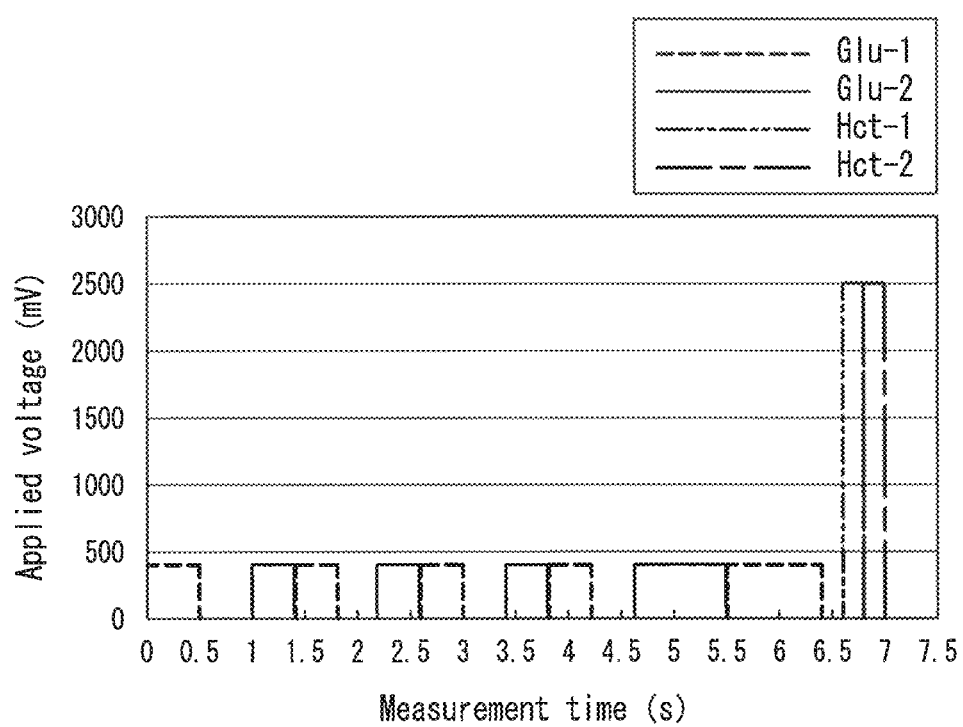
FIG. 15 is a diagram showing change in voltage value over time in a voltage application pattern in Embodiment 2B.

In Embodiment 2B, the measuring device 2 changes the electrodes to be subjected to voltage application, the applied voltage, the application time, and the timing of voltage application as shown in FIG. 16. A third voltage is applied between the electrodes in the third electrode system (including the electrode C serving as the working electrode and the electrodes D and E serving as the counter electrodes). In FIG. 15, voltage application indicated with "Glu-1" corresponds to the voltage application in this third step. The third voltage is 400 mV. The third step of applying the third voltage to the third electrode system and detecting a blood. component amount-dependent current value is performed a plurality of times, e.g., five times. In this Step B, after the third step, a voltage is applied to the fourth electrode system while controlling the voltage value and the application time of a fourth voltage (fourth step). The voltage application indicated with "Glu-2" in FIG. 16 is the voltage application in this fourth step. The fourth voltage is 400 mV. The fourth step of applying the fourth voltage to the fourth electrode system and detecting a blood component amount-dependent current value is performed a plurality of times, e.g., five times. The third steps and the fourth steps are performed in turn as follows, for example: the third step, the fourth step, the third step, the fourth step, and so on.

Embodiment 2B is the same as Embodiment 2A, except that, when the third step is performed at least twice in Step B, the third voltages are equal to each other. When the third voltages are equal to each other, the effects of interfering substances that react at different voltages can be observed.

According to Embodiment 2B, by applying the same voltage to the third and fourth electrode systems for measuring a blood component, the transition of the response values of interfering substances in the respective systems can be reflected in the amount of the blood component to be finally obtained.

Embodiment 2C

Embodiment 2C is an example of the blood component amount measurement method 2C of the present invention.

The biosensor used in this method is the same as the biosensor used in Embodiment 2A. In Embodiment 2C, the electrode 12 is used as the electrode A, the electrode 13 is used as the electrode C, the electrode 14 is used as the electrode D, the electrode 15 is used as the electrode E, the electrode 16 is used as the electrode G, and the electrode 17 is used as the electrode F. FIG. 20 shows which of the electrodes is used as the counter electrode and the working electrode of each of the first electrode system, the second electrode system, the third electrode system, and the fourth electrode system.

Figure 18:
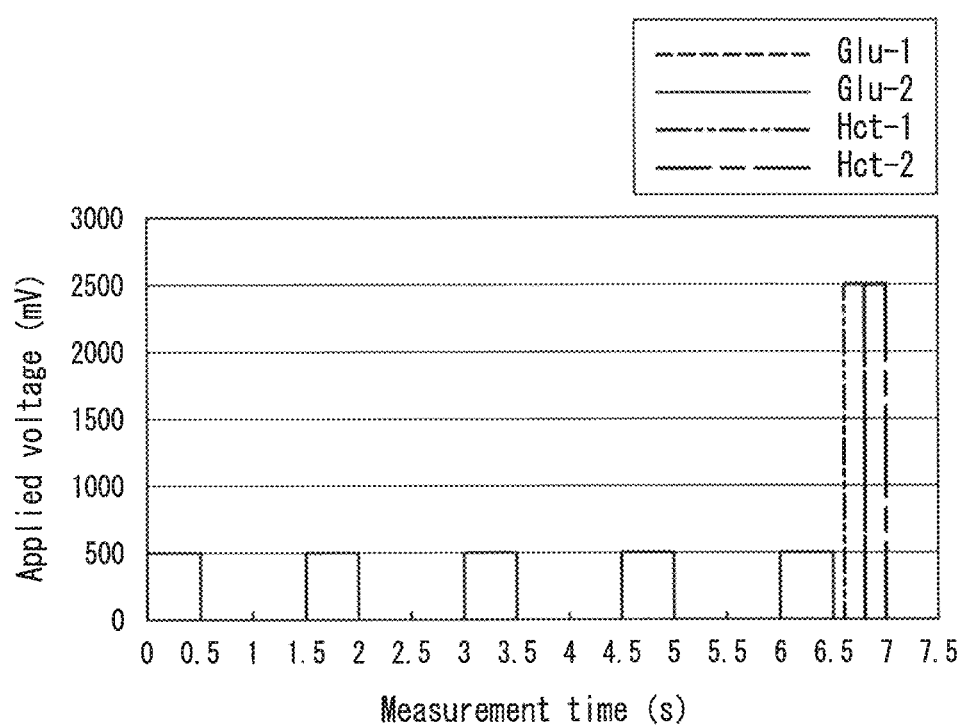
FIG. 18 is a diagram showing change in voltage value over time in a voltage application pattern in Embodiment 2C.

In Embodiment 2C, the measuring device 2 changes the electrodes to be subjected to voltage application, the applied voltage, the application time, and the timing of voltage application as shown in FIG. 19. A third voltage is applied between the electrodes in the third electrode system (including the electrode C serving as the working electrode and the electrodes D and E serving as the counter electrodes). In FIG. 18, voltage application indicated with "Glu-1" corresponds to the voltage application in this third step. The third voltage is 500 mV. The third step of applying the third voltage to the third electrode system and detecting a blood component amount-dependent current value is performed a plurality of times, e.g., five times. In Step B, at the same time as the third step, a voltage is applied to the fourth electrode system while controlling the voltage value and the application time of a fourth voltage (fourth step). In FIG. 18, voltage application indicated with "Glu-2" corresponds to the voltage application in this fourth step. The fourth voltage is 500 mV. The fourth step of applying the fourth voltage to the fourth electrode system and detecting a blood component amount-dependent current value is performed a plurality of times, e.g., five times.

Embodiment 2C is the same as Embodiment 2B, except that the third steps are performed at the same time as the fourth steps, respectively, in Step B. By performing the third steps at the same time as the fourth steps, respectively, Step B includes longer blank periods during which a voltage is not applied, and the states at different sites can be measured at the same time within the same period of time.

Embodiment 2D

Embodiment 2D is an example of the blood component amount measurement method 2D of the present invention.

The biosensor used in this method is the same as the biosensor used in Embodiment 2A. In Embodiment 2D, the electrode 12 is used as the electrode A, the electrode 13 is used as the electrode C, the electrode 14 is used as the electrode D, the electrode 15 is used as the electrode E, the electrode 16 is used as the electrode G, and the electrode 17 is used as the electrode F. In Embodiments 2A, 2B, and 2C, the first electrode system, the second electrode system, the third electrode system., and the fourth electrode system are provided. In Embodiment 2D, a fifth electrode system is further provided in addition to these electrode systems. FIG. 23 shows which of the electrodes is used as the counter electrode and the working electrode of each of the first electrode system, the second electrode system, the third electrode system, the fourth electrode system, and the fifth electrode system.

Figure 21:
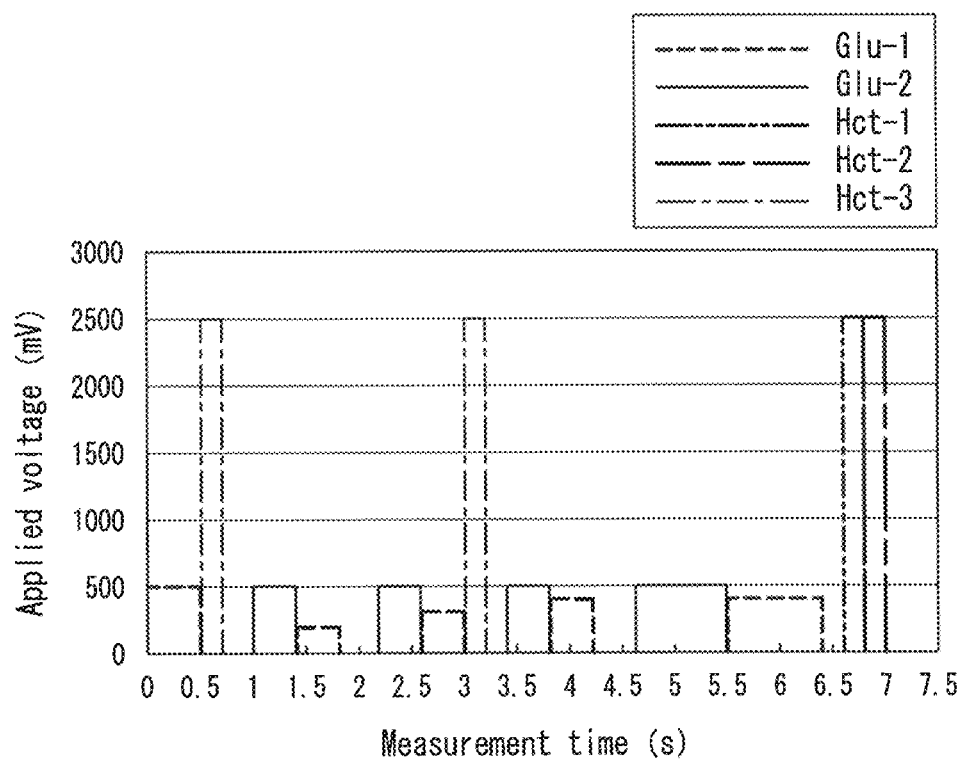
FIG. 21 is a diagram showing change in voltage value over time in a voltage application pattern in Embodiment 2D.

In Embodiment 2D, the measuring device 2 changes the electrodes to be subjected to voltage application, the applied voltage, the application time, and the timing of voltage application as shown in FIG. 22. A third voltage is applied between the electrodes in the third electrode system (including the electrode C serving as the working electrode and the electrodes D and E serving as the counter electrodes). In FIG. 21, voltage application indicated with "Glu-1" corresponds to the voltage application in this third step. The third voltage is 500 mV. The third step of applying the third voltage to the third electrode system and detecting a blood component amount-dependent current value is performed a plurality of times, e.g., five times. In this Step B, after the third step, a voltage is applied to the fourth electrode system while controlling the voltage value and the application time of a fourth voltage (fourth step). In FIG. 22, voltage application indicated with "Glu-2" corresponds to the voltage application in this fourth step. The fourth step of applying the fourth voltage to the fourth electrode system and detecting a blood component amount-dependent current value is performed a plurality of times, e.g., five times. The third steps and the fourth steps are performed in turn as follows, for example: the third step, the fourth step, the third step, the fourth step, and so on.

Embodiment 2D is the same as Embodiment 2A, except that a fifth step is performed at least once during a period in which neither the third step nor the fourth step is performed and prior to the first step and the second step. It is preferable to further perform the fifth step as described above because the effects of interfering substances that react at different voltages can be observed.

A fifth voltage is applied between the electrodes in the fifth electrode system (including the electrode F serving as the working electrode and the electrode G serving as the counter electrode). In FIG. 21, voltage application indicated with "Hct-3" corresponds to the voltage application in this fifth step. The fifth voltage is 2500 mV.

In Embodiment 2D, the fifth step may be performed at least twice, and the fifth voltages may be equal to each other.

According to Embodiment 2D, in addition to the first step and the second step, the fifth voltage is further applied to the fifth voltage system for measuring the hematocrit prior to the first step and the second step. This allows the transition of the response values of interfering substances accompanying the change in temperature to be reflected in the amount of a blood component to be finally obtained.

Embodiment 2E

Embodiment 2E is an example of the blood component amount measurement method 2E of the present invention.

The biosensor used in this method is the same as the biosensor used in Embodiment 2A. In Embodiment 2E, the electrode 12 is used as the electrode A, the electrode 13 is used as the electrode C, the electrode 14 is used as the electrode D, the electrode 15 is used as the electrode E, the electrode 16 is used as the electrode G, and the electrode 17 is used as the electrode F. In Embodiments 2A, 2B, and 2C, the first electrode system, the second electrode system, the third electrode system, and the fourth electrode system are provided. In Embodiment 2E, a fifth electrode system is further provided in addition to these electrode systems. FIG. 26 shows which of the electrodes is used as the counter electrode and the working electrode of each of the first electrode system, the second electrode system, the third electrode system, the fourth electrode system, and the fifth electrode system.

Figure 24:
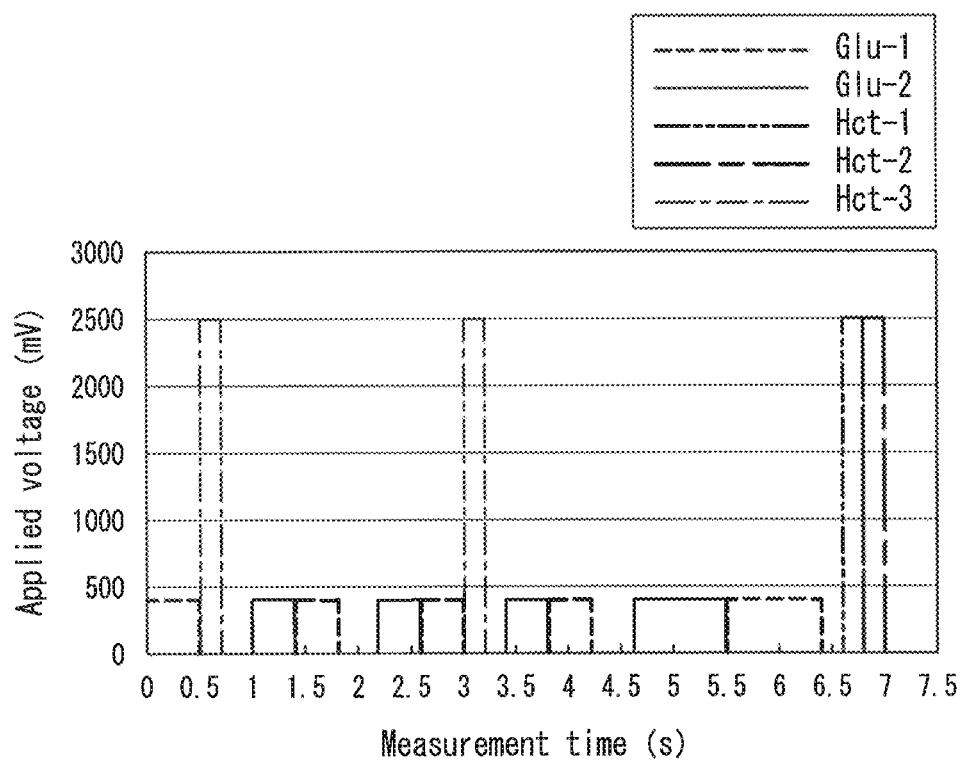
FIG. 24 is a diagram showing change in voltage value over time in a voltage application pattern in Embodiment 2E.

In Embodiment 2E, the measuring device 2 changes the electrodes to be subjected to voltage application, the applied voltage, the application time, and the timing of voltage application as shown in FIG. 25. A third voltage is applied between the electrodes in the third electrode system (including the electrode C serving as the working electrode and the electrodes D and E serving as the counter electrodes). In FIG. 24, voltage application indicated with "Glu-1" corresponds to the voltage application in this third step. The third voltage is 400 mV. The third step of applying the third voltage to the third electrode system and detecting a blood component amount-dependent current value is performed a plurality of times, e.g., five times. In this Step B, after the third step, a voltage is applied to the fourth electrode system while controlling the voltage value and the application time of a fourth voltage (fourth step). In FIG. 24, voltage application indicated with "Glu-2" corresponds to the voltage application in this fourth step. The fourth step of applying the fourth voltage to the fourth electrode system and detecting a blood component amount-dependent current value is performed a plurality of times, e.g., five times. The third steps and the fourth steps are performed in turn as follows, for example: the third step, the fourth step, the third step, the fourth step, and so on.

Embodiment 2E is the same as Embodiment 2B, except that the fifth step is performed at least once during a period in which neither the third step nor the fourth step is performed and prior to the first step and the second step. By further performing the fifth step as described above, the effects of interfering substances that react at different voltages can be observed.

A fifth voltage is applied between the electrodes in the fifth electrode system (including the electrode F serving as the working electrode and the electrode G serving as the counter electrode). In FIG. 24, voltage application indicated with "Hct-3" corresponds to the voltage application in this fifth step. The fifth voltage is 2500 mV.

In Embodiment 2E, the fifth step may be performed at least twice, and the fifth voltages may be equal to each other.

According to Embodiment 2E, in addition to the first step and the second step, the fifth voltage is further applied to the fifth voltage system for measuring the hematocrit prior to the first step and the second step. This allows the transition of the response values of interfering substances accompanying the change in temperature to be reflected in the amount of a blood component to be finally obtained.

INDUSTRIAL APPLICABILITY

As described above, the biosensor production method according to the present invention can produce a biosensor capable of measuring a component of a biological. sample with higher accuracy Accordingly, the production method of the present invention can be used preferably in all fields involving blood component measurement, such as biology biochemistry and medicine, and is particularly suited to the field of clinical examinations.

LIST OF REFERENCE NUMERALS

2 Measuring device
3 Sensor
4 Display portion
5 Insertion port
10 Blood supply port
101 Insulating substrate
102 Spacer
103 Cover
6 First reagent layer
7 Second reagent layer
8 Channel
9 Air hole
12 Electrode A
13 Electrode C
14 Electrode D
15 Electrode E
16 Electrode G
17 Electrode F
19 Slit portion
20 Slit portion
201 Insulating substrate
202 Spacer
203 Cover
32 Third reagent layer
33 Second reagent layer
34 Channel
35 Air hole
22 Electrode A
23 Electrode C
24 Electrode D
25 Electrode E
26 Electrode G
27 Electrode F
29 Slit portion
30 Slit portion 106 Input terminal portion
130 A/D conversion unit
131 Determination means
132 Display unit
133 Power supply unit
134 Memory
135 Clock
136 Correction means
137 Voltage application unit
138 Current-voltage conversion unit
139 Control unit

The invention claimed is:

1. A method for measuring the amount of a blood component in blood using a biosensor,
the biosensor comprising:
a first electrode system for measuring a hematocrit-dependent current value, the first electrode system including a first working electrode and a first counter electrode;
a second electrode system for measuring a hematocrit-dependent current value, the second electrode system including the first working electrode and a second counter electrode; and
a third electrode system for measuring a blood component amount-dependent current value, the third electrode system including a third working electrode and a third counter electrode,
wherein a first reagent layer is disposed on the second counter electrode,
a second reagent layer is disposed on the third working electrode and the third counter electrode,
the first reagent layer and the second reagent layer are disposed spaced apart from each other,
the first reagent layer and the second reagent layer are not disposed on the first working electrode,
the first counter electrode and the second counter electrode are disposed spaced apart from each other,
at least one of the third working electrode and the third counter electrode is used as the first counter electrode, and
the second reagent layer contains a reagent for measuring the amount of the blood component in the blood,
the method comprising:
a first step of applying a first voltage to the first electrode system and detecting a first hematocrit-dependent current value;
a second step of applying a second voltage to the second electrode system and detecting a second hematocrit-dependent current value;
a third step of applying a third voltage to the third electrode system and detecting a blood component amount-dependent current value; and
a step of calculating the amount of the blood component using the blood component amount-dependent current value, the first hematocrit-dependent current value, and the second hematocrit-dependent current value, based on a calibration curve prepared beforehand.

2. The method according to claim 1, wherein the third step is performed at least twice, and two or more blood component amount-dependent current values obtained are used as the blood component amount-dependent current values in the step of calculating the amount of the blood component.

3. The method according to claim 1, wherein the first step and the second step are performed after the third step.

4. The method according to claim 1, wherein the first reagent layer and the second reagent layer each contain a mediator.

5. The method according to claim 1, wherein the second reagent layer further contains an oxidoreductase.

6. The method according to claim 1, wherein the calibration curve is represented in a calilbration table.

7. A method for measuring the amount of a blood component in blood using a biosensor,
the biosensor comprising:
a first electrode system for measuring a hematocrit-dependent current value, the first electrode system including a first working electrode and a first counter electrode;
a second electrode system for measuring a hematocrit-dependent current value, the second electrode system including the first working electrode and a second counter electrode;
a third electrode system for measuring a blood component amount-dependent current value, the third electrode system including a third working electrode and a third counter electrode; and
a fourth electrode system for measuring a blood component amount-dependent current value, the fourth electrode system including a fourth working electrode and a fourth counter electrode,
wherein a second reagent layer is disposed on the third working electrode and the third counter electrode,
a third reagent layer is disposed on the fourth working electrode and the fourth counter electrode,
the second reagent layer and the third reagent layer are disposed spaced apart from each other,
the second reagent layer and the third reagent layer are not disposed on the first working electrode,
the first counter electrode and the second counter electrode are disposed spaced apart from each other,
at least one of the third working electrode and the third counter electrode is used as the first counter electrode,
at least one of the fourth working electrode and the fourth counter electrode is used as the second counter electrode, and
the second reagent layer and the third reagent layer each contain a reagent for measuring the amount of the blood component in the blood,
the method comprising:
a first step of applying a first voltage to the first electrode system and detecting a first hematocrit-dependent current value;
a second step of applying a second voltage to the second electrode system and detecting a second hematocrit-dependent current value;
a third step of applying a third voltage to the third electrode system and detecting a first blood component amount-dependent current value;
a fourth step of applying a fourth voltage to the fourth electrode system and detecting a second blood component amount-dependent current value; and
a step of calculating the amount of the blood component using the first blood component amount-dependent current value, the second blood component amount-dependent current value, the first hematocrit-dependent current value, and the second hematocrit-dependent current value, based on a calibration curve prepared beforehand.

8. The method according to claim 7,
wherein the first step and the second step are performed after the third step and the fourth step.

9. The method according to claim 7,
wherein the third step is performed at least twice, and
two or more first blood component amount-dependent current values obtained are used as the first blood component amount-dependent current values in the step of calculating the amount of the blood component.

10. The method according to claim 9,
wherein, in voltage application when the third step is performed at least twice, the third voltages are different from each other.

11. The method according to claim 9,
wherein, in voltage application when the third step is performed at least twice, the third voltages are equal to each other.

12. The method according to claim 7,
wherein the fourth step is performed at least twice, and
two or more second blood component amount-dependent current values obtained are used as the second blood component amount-dependent current values in the step of calculating the amount of the blood component.

13. The method according to claim 12,
wherein, in voltage application when the fourth step is performed at least twice, the fourth voltages are equal to each other.

14. The method according to claim 7,
wherein the third step is performed at least twice and two or more first blood component amount-dependent current values obtained are used as the first blood component amount-dependent current values in the step of calculating the amount of the blood component,
the fourth step is performed at least twice and two or more second blood component amount-dependent current values obtained are used as the second blood component amount-dependent current values in the step of calculating the amount of the blood component, and
the third steps and the fourth steps are performed alternately.

15. The method according to claim 14,
wherein the biosensor further includes a fifth electrode system for measuring a hematocrit-dependent current value, the fifth electrode system including the first working electrode and the fourth counter electrode,
the method further includes a fifth step of applying a fifth voltage to the fifth electrode system and detecting a third hematocrit-dependent current value, and
the fifth step is performed at least once during a period in which neither the third step nor the fourth step is performed and prior to the first step and the second step.

16. The method according to claim 15,
wherein the fifth step is performed at least twice, and the fifth voltages are equal to each other.

17. The method according to claim 15,
wherein, in voltage application when the third step is performed at least twice, the third voltages are different from each other.

18. The method according to claim 15,
wherein, in voltage application when the third step is performed at least twice, the third voltages are equal to each other.

19. The method according to claim 7,
wherein the third step is performed at least twice and two or more first blood component amount-dependent current values obtained are used as the first blood component amount-dependent current values in the step of calculating the amount of the blood component,
the fourth step is performed at least twice and two or more second blood component amount-dependent current values obtained are used as the second blood component amount-dependent current values in the step of calculating the amount of the blood component, and
the third steps are performed at the same time as the fourth steps, respectively.

20. The method according to claim 19,
wherein, in voltage application when the third step is performed at least twice, the third voltages are different from each other.

21. The method according to claim 19,
wherein, in voltage application when the third step is performed at least twice, the third voltages are equal to each other.

22. The method according to claim 7,
wherein the second reagent layer and the third reagent layer each contain a mediator.

23. The method according to claim 7,
wherein the second reagent layer and the third reagent layer each further contain an oxidoreductase.

24. The method according to claim 7, wherein the calibration curve is represented in a calilbration table.

* * * * *